United States Patent
Freitas et al.

(10) Patent No.: US 6,401,110 B1
(45) Date of Patent: *Jun. 4, 2002

(54) METHOD FOR MANAGING CONCURRENT PROCESSES USING DUAL LOCKING

(75) Inventors: Richard Francis Freitas, San Martin; Divyesh Jadav, Campbell; Deepak Kenchammana-Hosekote, Sunnyvale; Jaishankar Moothedath Menon; Hovey Raymond Strong, Jr., both of San Jose, all of CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,101

(22) Filed: Nov. 30, 1998

(51) Int. Cl.⁷ .......................... G06F 9/00; G06F 15/173
(52) U.S. Cl. ...................... 709/104; 709/226; 709/229
(58) Field of Search ................................ 709/229, 104, 709/107, 106, 203, 102, 224, 226, 213

(56) References Cited

U.S. PATENT DOCUMENTS

| | | | |
|---|---|---|---|
| 4,604,694 A | 8/1986 | Hough | 364/200 |
| 4,864,559 A | 9/1989 | Perlman | 370/60 |
| 5,161,227 A * | 11/1992 | Dias et al. | 709/104 |
| 5,226,079 A * | 7/1993 | Holloway | 713/177 |
| 5,243,596 A | 9/1993 | Port et al. | 370/94.1 |
| 5,263,161 A | 11/1993 | Barth et al. | 395/650 |
| 5,339,443 A | 8/1994 | Lockwood | 395/725 |
| 5,341,491 A * | 8/1994 | Ramanujan | 711/152 |
| 5,392,433 A | 2/1995 | Hammersley et al. | 395/725 |
| 5,454,108 A * | 9/1995 | Devarakonda et al. | 709/104 |
| 5,463,733 A | 10/1995 | Forman et al. | 395/182.08 |
| 5,502,840 A | 3/1996 | Barton | 395/726 |

(List continued on next page.)

FOREIGN PATENT DOCUMENTS

EP 000665495 A2 * 8/1995 ............. G06F/9/46

OTHER PUBLICATIONS

R. J. Anderson et al., "Wait–free Parallel Alogrithms for the Union–Find Problem", Proceedings 23$^{th}$ ACM STOC., 1991, pp. 370–380.

(List continued on next page.)

*Primary Examiner*—Glenton B. Burgess
*Assistant Examiner*—Bradley Edelman
(74) *Attorney, Agent, or Firm*—Dan Hubert & Associates

(57) ABSTRACT

Multiple competing processors cooperatively manage access to a shared resource. Each processor separately stores a lock table, listing shared resource subparts, such as memory addresses of a data storage device, for example. The lock tables are stored in nonvolatile storage. In each lock table, each subpart is associated with a "state," such as; LOCAL or REMOTE. In response to access requests from the hosts, the processors exchange various messages to cooperatively elect a single processor to have exclusive access to the subparts involved in the access requests. After one processor is elected, the lock-holding processor configures its lock table to show the identified subpart in the LOCAL state, and all non-lock-holding processors configure their lock tables to show the identified subpart in the REMOTE state. Thus, rather than replicating one lock table for all processors, the processors separately maintain lock tables that are coordinated with each other. Importantly, each processor honors its lock table by refraining from accessing a subpart of the shared resource unless the processor's lock table indicates a LOCAL state for that subpart. In one embodiment, optimized for the two processor environment, the messages exchanged by the processors include lock request, lock release, and lock grant messages.

52 Claims, 10 Drawing Sheets

U.S. PATENT DOCUMENTS

| | | | | |
|---|---|---|---|---|
| 5,513,354 | A | | 4/1996 | Dwork et al. ............... 395/650 |
| 5,577,261 | A | | 11/1996 | Harinarayan et al. ....... 395/800 |
| 5,623,670 | A | | 4/1997 | Bohannon et al. .......... 395/726 |
| 5,630,140 | A | | 5/1997 | Modiri et al. ............... 395/726 |
| 5,682,470 | A | | 10/1997 | Dwork et al. ............ 395/182.1 |
| 5,729,749 | A | | 3/1998 | Ito ............................. 395/726 |
| 6,032,216 | A | * | 2/2000 | Schmuck et al. ........... 709/226 |
| 6,041,383 | A | * | 3/2000 | Jeffords et al. ............. 709/229 |
| 6,044,373 | A | * | 3/2000 | Gladney et al. ............. 707/10 |
| 6,105,057 | A | * | 8/2000 | Kuftedjian et al. ......... 709/213 |
| 6,112,222 | A | * | 8/2000 | Govindaraju et al. ....... 709/102 |
| 6,145,006 | A | * | 11/2000 | Vishlitsky et al. .......... 709/229 |
| 6,151,688 | A | * | 11/2000 | Wipfel et al. ............... 709/224 |
| 6,173,308 | B1 | * | 1/2001 | Hilditch et al. ............. 709/106 |
| 6,173,313 | B1 | * | 1/2001 | Klots et al. ................. 709/203 |
| 6,175,853 | B1 | * | 1/2001 | Stracke, Jr. ................. 709/107 |
| 6,185,562 | B1 | * | 2/2001 | Dahlen et al. .............. 709/400 |
| 6,189,007 | B1 | * | 2/2001 | Boonie et al. .............. 709/104 |
| 6,212,548 | B1 | * | 4/2001 | DeSimone et al. ......... 709/204 |

OTHER PUBLICATIONS

Bernstein et al., *Concurrency Control and Recovery in Database Systems*, Chapters 7.3–7.4, pp. 222–240.

T. D. Chandra et al., "On the Impossibility of Group Membership", ACM 1996, p. 322.

T. D. Chandra, "Polylog Randomzied Wait–Free Consensus", Proceedings of $15^{th}$ ACM Symposium on Principles of Distributed Computing, 1996, pp. 166–175.

T. D. Chandra et al., "Unreliable Failure Detectors for Asynchronous Systems", Proceedings of $10^{th}$ ACM Symposium on Principles of Distributed Computing, 1991, pp. 325–340.

S. Chaudhuri et al., "Understanding the Set Consensus Partial Order Using the Borowsky–Gafni Simulation", Proceedings of $10^{th}$ International Workshop on Distributed Algorithms, Italy, 1996, pp. 362–379.

D. Dolev et al., "A Framework for Partitionable Membership Service", ACM 1996, pp. 343 and 1–15.

D. Dolev et al., "Efficient Message Ordering in Dynamic Networks", $15^{th}$ Annual ACM Symposium on Principles of Distributed Computing, 1996, pp. 68–76.

C. Dwork et al., "Collective Consistency", LN in CS 1151 WDAG Proceedings 1996, p. 234.

C. Dwork et al., "Collective Consistency (Work in Progress)," ACM 1996, p. 341.

S. Fakhouri et al., "Processor Group Membership Protocols: Specification, Design and Implementation", $12^{th}$ Symposium on Reliable Distributed Systems, Oct. 1993, pp. 1–11.

B. Hajek et al., "The Time Complexity of Maximum Matching by Simulated Annealing", Journal of the Association for Computing Machinery, vol. 35, No. 2, Apr. 1988, pp. 387–403.

B. W. Lampson, "How to Build a Highly Available System Using Consensus", $10^{th}$ International Workshop—Distributed Algorithms, Italy, 1996, pp. 1–17.

G. Neiger, "A New Look at Membership Services", ACM 1996, p. 331.

J. D. Palmer et al, U.S. Patent Application No. 08/972,111, entitled "Method and Apparatus for Ordered Reliable Multicast With Asymmetric Safety in a Multiprocessing System", filed Nov. 17, 1997, pp. 1–42.

A. Ricciardi, "Impossibility of (Repeated) Reliable Broadcast", ACM 1996, p. 342.

* cited by examiner

METHOD FOR MANAGING CONCURRENT PROCESSES USING DUAL LOCKING

BACKGROUND OF THE INVENTION

1. Field of the Invention

The present invention relates to computer systems with multiple processing units. More particularly, the invention concerns a method for managing access to a shared resource among competing processing units.

2. Description of the Related Art

Today people are confronted with an astonishing amount of electronic information to manage. Such management involves transmitting, receiving, processing, and storing electronic data. To meet these challenges, many people choose computer systems with multiple processing units. These systems enjoy significant computing power by using separate computers, microprocessors, processing threads, or other types of processing. These processing units may also be known by terms such as processors, processing elements, etc.

One recurring challenge to systems with multiple processors involves the sharing of resources by the multiple processors. As one example, digital data storage such as magnetic "hard" disk drive storage is often shared by multiple storage "adapters." Sharing such a resource is challenging because of the difficulties in arbitrating access to the resource. At any given time, which processor should be permitted access to the shared resource? Should other processors be given limited concurrent access? This is further complicated by the need to plan for possible failure of a processor or communications between the processors.

One popular approach to sharing computer resources is called "mutual exclusion," which is often applied at the device level. With this approach, processors access the resource one-at-a-time. While one processor is accessing the resource, all other processors are excluded from that device. Although this approach is attractive in its simplicity, shared computer resources often possess significantly more input/output ("I/O") capability than the processors that manage them. In this case, the full throughput of the shared resource is wasted when it is being used by one processor to the exclusion of the other processors.

In the case of storage resources, the system takes longer to store and retrieve data when the processors are confined by one-at-a-time access rules. This is undesirable, since slower data storage and retrieval are frustrating to most computer users. Furthermore, slow data access may be intolerable in certain data-critical applications, such as automated teller networks, airline reservation systems, stock brokerage, etc. Furthermore, the use of mutual exclusion is complicated by the possibility that a processor with exclusive access to the shared resource experiences a failure, causing a severe problem for the excluded processors.

To orchestrate mutual exclusion, competing processors must exchange messages of some type. A different set of problems is thus presented by the possibility that messages are lost while a device is reserved to one processor, causing a situation known as "livelock." A further difficulty inherent to mutual exclusion schemes is the need to fairly allocate access to the shared resource among competing processors, the consequences of misallocation potentially including "starvation" of the losing processor.

Consequently, known strategies for arbitrating processor access to shared resources are not completely adequate for some applications due to various unsolved problems.

SUMMARY OF THE INVENTION

Broadly, the present invention concerns a method and apparatus for managing access to a shared resource among competing processors. The invention includes features that are particularly optimized for environments with two "processors," also referred to as processing units, processing elements, nodes, servers, computers, adapters, etc. The invention is applied in a system with multiple processors that commonly access a shared resource, such as a digital data storage. The processors receive and process access requests originating at one or more hosts.

Each processor separately stores a lock table, listing subparts of the shared resource, such as memory addresses, extents, logical devices, or an entire physical data storage device. The lock tables are stored in nonvolatile storage. In each lock table, each subpart of the shared resource is associated with a "state" such as LOCAL or REMOTE. In response to access requests from the hosts, the processors exchange various messages to cooperatively elect a single processor to have exclusive access to the subparts involved in the access requests. After one processor is elected, the lock-holding processor configures its lock table to show the identified subpart in the LOCAL state, and all non-lock-holding processors configure their lock tables to show the identified subpart in the REMOTE state. Thus, rather than replicating one lock table for all processors, the processors separately maintain lock tables that are coordinated with each other. Importantly, each processor refrains from accessing a subpart of the shared resource unless the processor's lock table indicates a LOCAL state for that subpart.

In one embodiment, optimized for the two processor environment, the messages exchanged by the processors include lock request, lock release, and lock grant messages. When a processor seeks access to a subpart, but its lock table indicates a REMOTE state for the lock, the other processor owns the lock. In this case, the first processor transmits a lock request to the other processor. The lock-holding processor enqueues the lock request. The lock-holding processor sequentially processes queued messages, and upon reaching the first processor's lock request, the second processor takes steps to hand the lock to the first processor. In particular, the second processor configures its lock table to indicate the REMOTE state for the subpart, and then transmits a lock grant message back to the first processor. In response, the first processor configures its lock table to show the subpart in the LOCAL state, at which point the first processor is free to access the requested shared resource subpart.

To increase reliability of message exchange, each message may include a token, where the processors require matching tokens for corresponding messages, such as lock grant and lock release messages. Using tokens increases the system's tolerance of lost messages, duplicated messages, misordered messages, communication faults, etc.

The subpart states may also include a FREE state, in which no processor holds a lock on that subpart. In this case, a requesting processor's lock request message can be satisfied with a prompt lock grant from the other processor.

Accordingly, in one embodiment the invention may be implemented to provide a method to manage access to a shared resource among competing processors. In another embodiment, the invention may be implemented to provide an apparatus, such as an adapter or other processing unit of a system with multiple processors, programmed to participate in the management of shared resource access. In still another embodiment, the invention may be implemented to provide a signal-bearing medium tangibly embodying a program of machine-readable instructions executable by a digital data processing apparatus to perform method steps for managing access to a shared resource among competing processors.

The invention affords its users with a number of distinct advantages. First, the invention takes advantage of the high-throughput capability of shared resources by more efficiently sharing the resources. In the data storage environment, for example, the invention stores and retrieves data more quickly. Consequently, computer users are more pleased with their systems, since they are faster to use. The invention is especially beneficial for the common configuration where two adapters or other processors share access to a common resource.

Furthermore, the invention provides a number of desirable properties for a dual locking protocol. These include safety, liveness, fairness, and efficiency. Safety is provided because if a lock is in the LOCAL state at one adapter, then it is in the REMOTE state at the other adapter. Liveness is provided because the invention guarantees eventual progress in granting locks, since individual locks are eventually released (because of completion or timeout), and because frustrated processors make repeated requests for a lock. Fairness is provided because each processor makes eventual progress in obtaining a lock without "starving" the other adapter. Efficiency is provided because there is minimal overhead involved in maintaining the status quo when a lock-holding processor receives multiple local requests for a lock while the other processor receives none.

The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns the management of access to a shared resource among competing processors.

Hardware Components & Interconnections
Multiple-Processor System

Figure 1A:
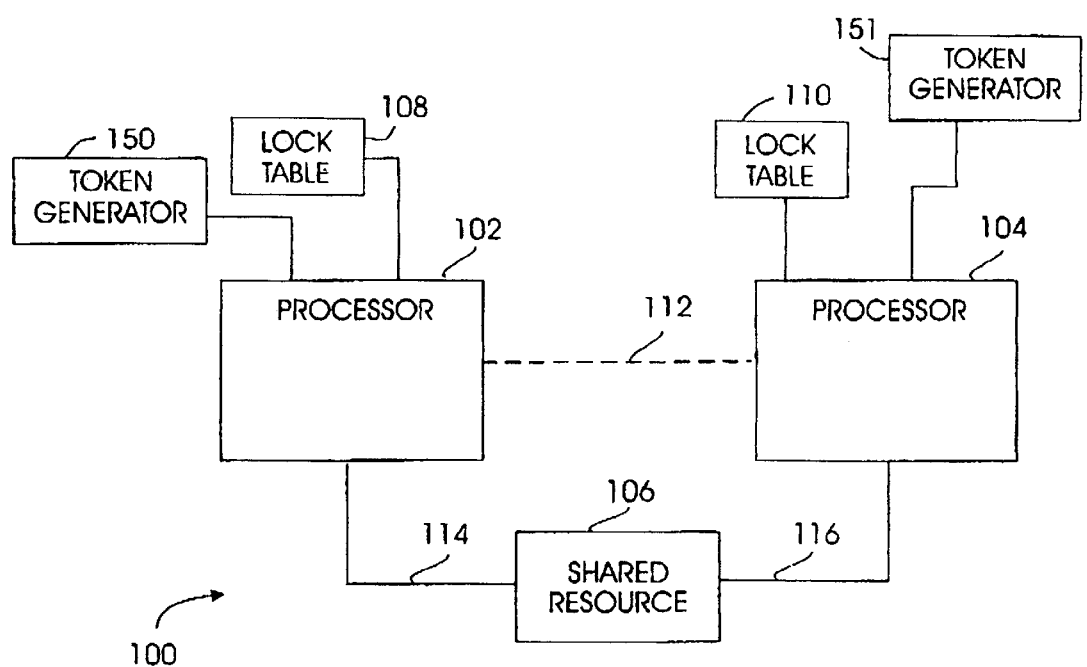
FIG. 1A is a block diagram of the hardware components and interconnections of a system with multiple processors in accordance with the invention.

One aspect of the invention concerns a system with multiple processors, which may be embodied by various hardware components and interconnections as shown by the system 100 of FIG. 1A. The system 100 includes two processors 102, 104 and a shared resource 106. The processors 102, 104 may be provided by hardware constructs (e.g., microprocessors, supercomputers, mainframe computers, computerworkstations, personal computers, or other suitable digital data processing machines), software (e.g., processes, processing threads, software programs, subroutines, firmware, etc.), or a combination of hardware and software.

The shared resource 106 may comprise any machine with storage, computing power, or other machine-accessible resource that is subdivisible into different subcomponents. As shown below, one example is a digital data storage, subdivisible into different storage addresses, ranges of addresses, address extents, logical devices, physical devices, etc.

The processors 102, 104 exchange machine-readable messages with the shared resource 106 over respective communications links 114,116. Inter-processor communication occurs over a communication link 112. The links 112, 114, 116 may be embodied by one or more cables, wires, backplanes, motherboards, fiber optic lines, infrared links, telephone line, intelligent communications channel, electromagnetic or other wireless links, computer networks (such as Internet, Intranet, wide area, LOCAL area, etc.), or another suitable mechanism for exchanging machine-readable messages. Furthermore, the link 112 maybe eliminated completely with the links 114, 116 being interconnected to provide a link between the two processors 102, 104. As another approach, the links 114, 116 may be eliminated with the resource 106 coupled to the link 112. Ordinarily skilled artisan (having the benefit of this disclosure) may recognize of variety of other approaches as well.

Each processor 102, 104 exclusively maintains a respective lock table 108, 110. The lock tables 108, 110 are contained in storage accessible by the processors 102, 104, which may be provided by nonvolatile storage device such as battery backed RAM memories, magnetic disk drives, optical tape, optical disk, magnetic tape, paper punch cards, or another suitable machine-accessible storage. As explained further below, each processor maintains in association with its lock table a queue of shared resource requests that are awaiting execution by the lock table's processor. For each subpart of the shared resource, the processors 102, 104 exchange certain messages to decide which processor will have exclusive access to that subpart.

Each processor 102, 104 also includes or otherwise has exclusive access to a respective token generator 150, 151. The token generators 150, 151 operate independently of each other. Each token generator 150, 151 comprises a mechanism to generate a code, which is used to increase the system's tolerance of lost messages. As discussed below, each message exchanged between the processors 102, 104 includes a token. New messages include a new token of the originating processor, whereas messages responding to another message must carry that earlier message's token to associate the two messages and thereby be effective.

In the present example, the token generators provide tokens that are binary numbers. Thus, the token generators 150, 151 may compromise respective registers, memory addresses, counters, etc. A token is generated in this example by incrementing a token generator. Each of the token generators 150, 151 provides a new token after one of its tokens is used or "grabbed." For instance, if the processor 102 obtains ("grabs") a token from the generator 151, the generator 151 then proceeds to generate a new token.

In the illustrated example, tokens of the token generators 150, 151 are non overlapping. In other words, each generator's tokens never match any tokens provided by the other generator. Where binary number tokens are used, this feature may be provided by ensuring that one token generator's most significant bit is always zero, whereas the other token generator's most significant bit is always one.

Additionally, each token generator is configured to rarely, if ever, repeat the same token. As an example, this feature may be provided by using a binary generator with a sufficiently high number of bits (e.g., thirty-two bits). A repeat cycle of about one year may be used successfully in many cases.

EXAMPLE

Storage System

Figure 1B:
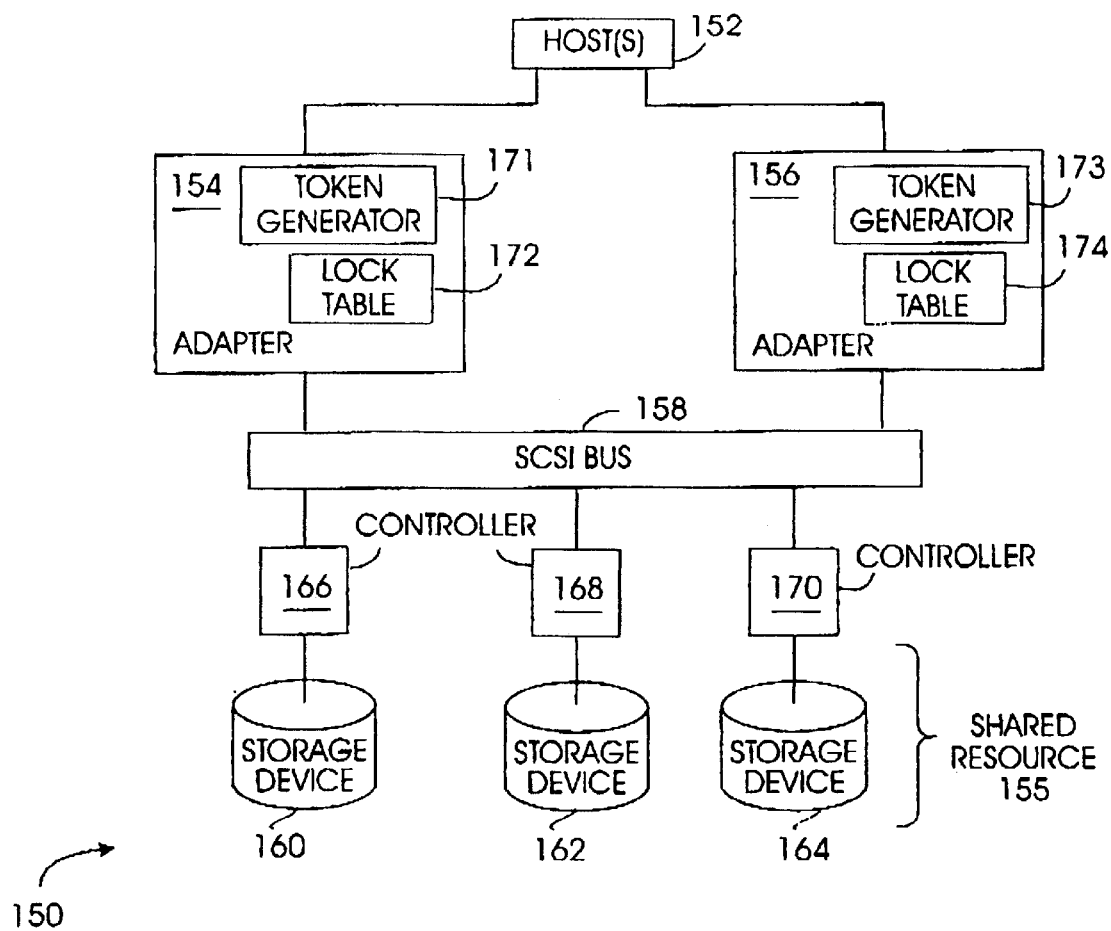
FIG. 1B is a block diagram of a digital data storage system employing dual locking in accordance with the invention.

FIG. 1B depicts a more particular example of the multiple processor system of the invention, in the form of a digital data storage system 150, in which the shared resource comprises data storage. The system 150 includes two storage adapters 154, 156 and a shared resource 155. The adapters 154, 156 are coupled to one or more hosts 152. The adapters 154, 156 may be coupled to the same host(s), completely different hosts, or a mix of common and distinct hosts. In one example, the adapters 154, 156 may comprise printed circuit boards physically and electrically mounted within the host(s) 152. As an even more specific example, the adapters 154, 156 may comprise IBM model ServeRAID II adapters.

In this example, each adapter 154, 156 houses a respective lock table 172, 174, stored in nonvolatile storage aboard the adapter. The nonvolatile storage may comprise, for example, random access memory ("RAM") with backup battery power, optical storage, hard drive storage, etc. The lock tables may comprise tables, linked lists, ASCII text, or another data structure suitable for storing information of the type discussed below.

Each adapter also includes a respective token generator 171, 173. The structure and operation of the token generators 171, 173 may resemble the token generators 150, 151, discussed above.

The shared resource 155 comprises some or all of one or more digital data storage devices. Such devices may include magnetic disk drives, optical tape, optical disk, magnetic tape, paper punch cards, or another suitable machine-accessible storage. A specific example is an IBM brand RAMAC disk drive storage subsystem. The shared resource 155 is subdivisible into "subparts," such as physical devices, logical devices, addresses, address ranges, extents, cylinders, sectors, or another unit. In the present example, the shared resource 155 is illustrated by multiple storage devices 160, 162, 164, managed by respective device controllers 166, 168, 170.

A common bus 158 is coupled to the controllers 166, 168, 170 and the adapters 154, 156 alike. In this example, the bus 158 comprises a small computer standard interface ("SCSI") bus, and carries communications between the adapters and the storage controllers, as well as between the adapters.

Exemplary Digital Data Processing Apparatus

Another aspect of the invention concerns a digital data processing apparatus, constituting one of the competing processors, or a component thereof, seeking access to a resource shared with another processor. This apparatus may be embodied by various hardware components and interconnections, and may be implemented in one example to provide the adapters 154, 156 (FIG. 1B).

Figure 2:
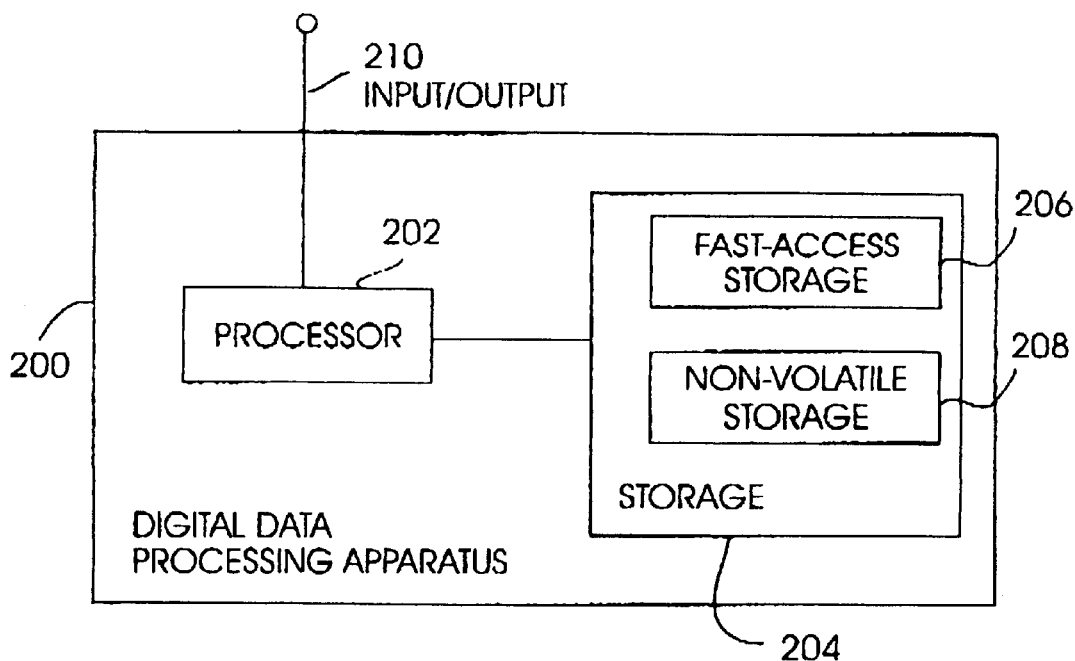
FIG. 2 is a block diagram of a digital data processing machine in accordance with the invention.

FIG. 2 shows an example of one digital data processing apparatus 200. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise RAM, and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for exchanging data with the processor 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Operation

In addition to the various hardware embodiments described above, a different aspect of the invention concerns a method for managing access to a shared resource among multiple competing processors.

Signal-Bearing Media

In the context of FIGS. 1B and 2, for example, such a method may be implemented, for example, by operating the adapters 154, 156, each as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to enable the processor to manage access to a shared resource relation to a competing processor.

This signal-bearing media may comprise, for example, RAM (not shown) contained within the adapter 154, 156

Figure 3:
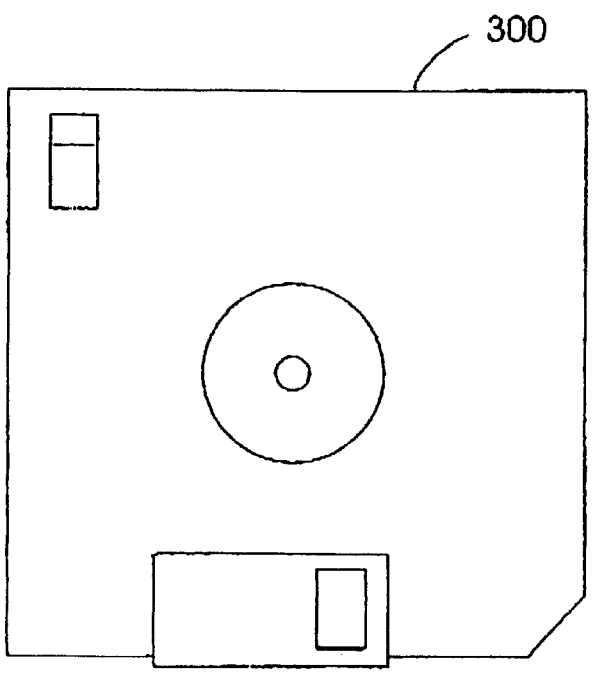
FIG. 3 shows an exemplary signal-bearing medium in accordance with the invention.

(FIG. 1B), as represented by the fast-access storage 206 (FIG. 2). Alternatively, the instructions may be contained in another signal-bearing media, such as a magnetic data storage diskette 300 (FIG. 3), directly or indirectly accessible by the adapter 154, 156. Whether contained in the adapters 154, 156 or elsewhere, the instructions may be stored on a variety of machine-readable data storage media, such as direct access storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Overall Sequence of Operation

Figure 4:
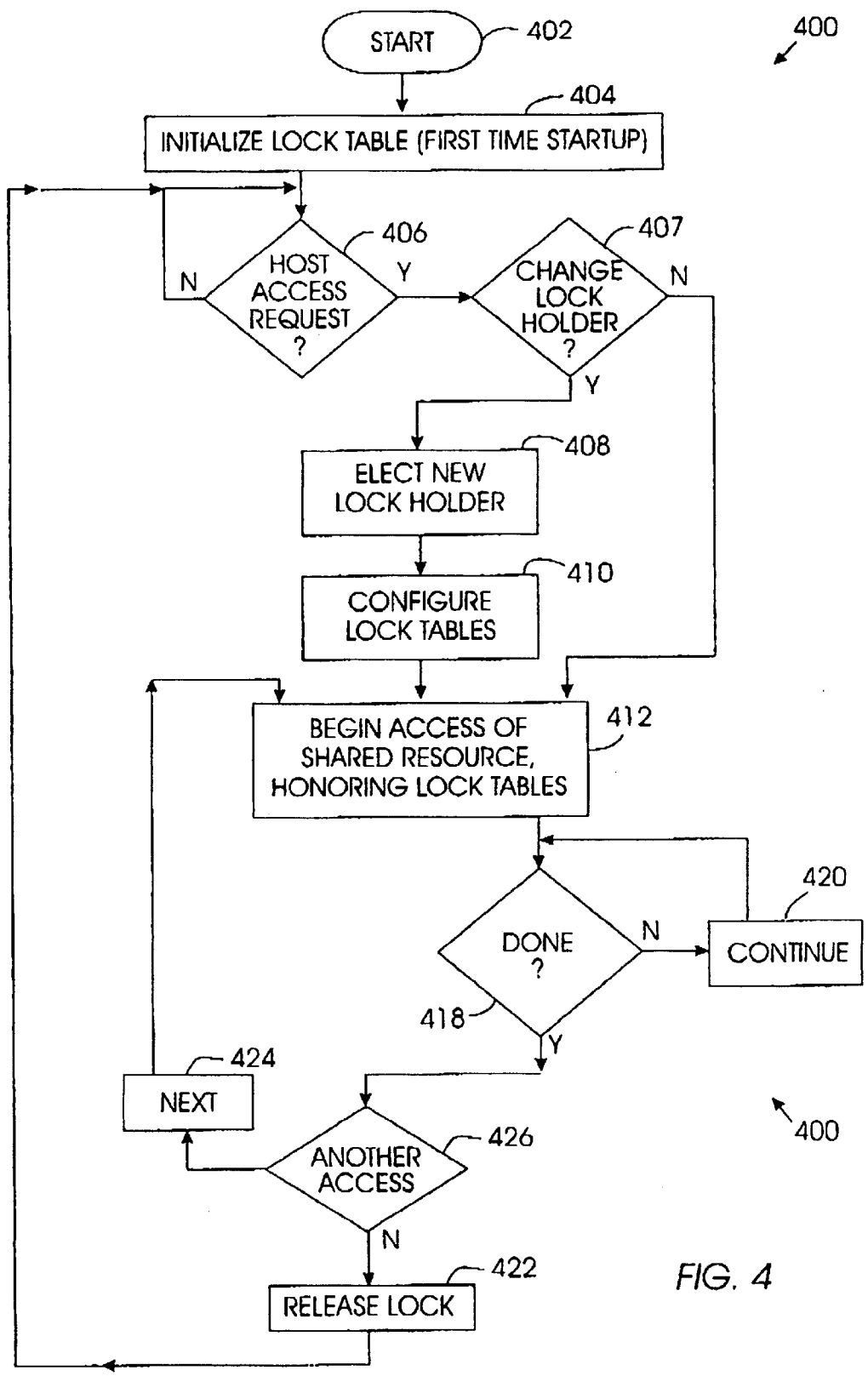
FIG. 4 is a flowchart depicting an overall operational sequence for accessing a shared resource using dual locking in accordance with the invention.

FIG. 4 shows a sequence 400 to provide an overall description of the method aspect of the present invention. For ease of explanation, but without any intended limitation, the example of FIG. 4 is described in the context of the hardware environment of FIG. 1B, described above. The sequence 400 begins in step 402, which may be performed whenever the system 150 is powered up, rebooted, or otherwise initiated.

In step 404, the adapters 154, 156 initialize their respective lock tables 172, 174 if needed. Namely, initialization is necessary of this is a first time startup, where no previous lock tables exist. In one embodiment, this may involve allocating storage for the lock tables 172, 174, preparing pointers, and performing other storage tasks to ready the tables for use. If desired, step 404 may additionally prepare blank entries in the lock table, where each entry corresponds to the minimum size of separately accessible shared resource subpart, such as a single address, partition, etc.

After step 404, the adapters 154, 156 await shared resource access requests from the hosts 152 (step 406). In response to such a request, which involves one or more identified subparts, the adapters 154, 156 cooperatively determine whether there should be any change in the lock holder (step 407). For instance, if no adapter holds the lock on the requested subparts, a change in the lock holder is needed to give the lock to the adapter that received the access request. In another example, the processor already owning the lock may maintain a queue of lock requesting tasks, including its own and lock requests from the other processor. Whenever the other processor's lock requests arrives at the head of the queue, there is a need for a change in the lock holder, i.e., to provide the lock to the lock requesting processor.

If no change in the lock holder is needed, the lock owning adapter begins to conduct the requested access of the shared resource (step 412). This access operation is the "current" operation. After step 412, the current access operation continues in steps 418 and 420 until finished. When the current access operation is finished, step 426 checks for receipt of another host access request from the host of the lock-owing adapter for the same subpart of the shared resource. When another host access request for this subpart is received, the new operation becomes the current access operation (step 424) and then control passes back to step 412, as discussed above.

On the other hand, if step 426 finds no more access requests, the lock holding adapter releases the lock (step 422) and then returns to step 406. Then, step 406 and the subsequent steps are performed as discussed above.

In contrast to the foregoing sequence, whenever step 407 determines that the lock holder must be changed, the adapters 154, 156 effectively change the lock holder in step 408. In the case of two adapters 154, 156 (as illustrated), this involves electing the non-lock-holding adapter to be the new lock holder. In the case of three or more processors, the processors may cooperatively elect a new lock holder using a suitably fair arbitration scheme, such as enqueing adapters' lock requests and processing the requests sequentially, etc. In response to step 408, the adapters configure their respective lock tables to reflect the newly elected lock holder, as shown by step 410.

The lock tables are adjusted as follows. The new lock holder configures its lock table to show the involved shared resource subparts in the LOCAL state. In contrast, the is non-lock-holder configures its lock table to show these subparts in the REMOTE state. Thus, rather than being replicated, the lock tables 172, 174 are "coordinated." Having configured their lock tables in step 410, the adapters then operate so as to honor contents of the lock tables. Namely, the lock-holding adapter conducts the access to the exclusion of the non-lock-holding adapter.

The foregoing process continues, with host access requests being received and processed, and changes in the lock holder being made when necessary, as shown above.

More Detailed Example

The following discussion, with reference to FIGS. 4A–12, further illustrates the invention by describing a detailed embodiment. Although the invention may be implemented with more adapters, the present example describes an especially valuable embodiment involving a system with managed access to shared digital storage among two adapters. This embodiment is described by disclosing various routines, which are performed by the adapters 154, 156.

Terminology

According to the invention, each processor maintains a lock table with multiple entries, each entry corresponding to a subpart of the shared resource. In the illustrated example, each subpart (a lock table entry) concerns an address range of the shared storage, and may vary in size.

Along with each address range (subpart), a lock table lists its adapter's state for that subpart, which concerns the status of that adapter's possession of a lock on that subpart. Each adapter has a certain state for each different subpart. As explained below, an adapter's state may vary from subpart to subpart. Also, the two adapters 154, 156 may have the same or a different state regarding the same address range. When a lock has been granted, the adapter owning the lock is the "LOCAL" adapter, and the non-owning adapter is the "REMOTE" adapter. The adapter owning the lock has exclusive access to the relevant subpart of the shared resource, on behalf of itself or as a conduit for its attached host(s). From the perspective of one adapter, the states include:

1. FREE—The lock is presently not granted to any adapter.
2. LOCAL—The lock has been granted for use by this adapter. The LOCAL state may be further divided into various sub-states if desired.
3. REMOTE—The lock has been granted to the other adapter. The REMOTE state may be further divided into various sub-states if desired.
4. REQ—The LOCAL adapter has a request in progress to the REMOTE adapter for this lock.

Figure 4A:
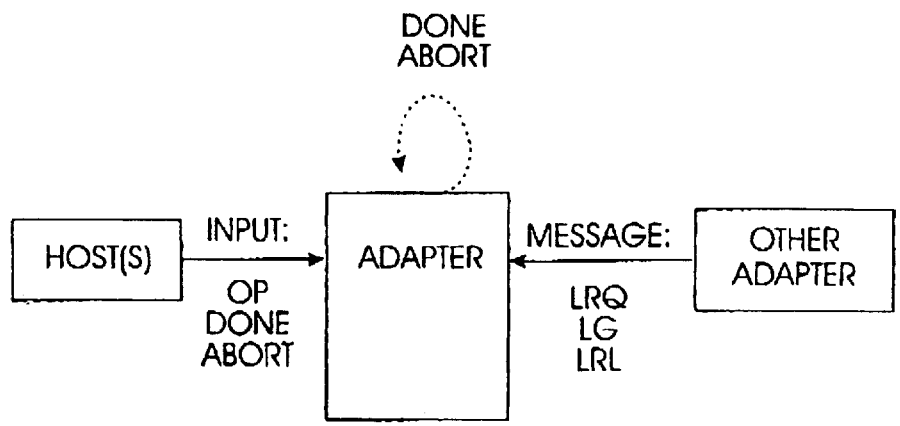
FIG. 4A is a partial system diagram showing the movement and source of one adapter's messages and input in a two adapter arrangement, in accordance with the invention.

As shown in FIG. 4A, the adapters exchange various "messages," and the hosts send "inputs" to the adapters. Adapters also self-generate certain "inputs." More specifically, the "messages" (adapter-to-adapter) include:

1. LRQ—(Lock Request) This is a request filed by one adapter for a lock on an associated shared resource subpart.
2. LRL—(Lock Release) This is a message returned by a LOCAL adapter relinquishing its lock on a shared resource subpart.
3. LG—(Lock Grant) This is a message returned by one adapter agreeing that the other adapter can have the lock, thereby affirmatively completing the other adapter's lock request (LRQ).

There are also various "input", which arise externally from an attached host and/or internally from the adapter itself. These input include:
1. OP—(Host Lock Request Input) This is a lock request from a host seeking access to a specified subpart of the shared resource. The receipt of this input signifies the very first step in the process of an adapter obtaining a lock on a subpart.
2. DONE—This input is received by an adapter (1) from an attached host When the host is finished using the locked address range of the shared resource, or (2) from itself when the adapter has finished processing an ABORT input, as discussed below.
3. ABORT—This self-generated input occurs when a "timeout" associated with a lock occurs, as discussed below.

The source and movement of messages and inputs are shown diagrammatically in FIG. 4A. As explained below, each adapter's lock table includes a queue for each subpart of the shared resource. The queues are used to serialize the processing of the inputs and certain messages applicable to that address range, from the standpoint of the adapter associated with that queue.

Certain events constitute "stimuli," which cause an adapter to emerge from a "wait" processing state and take certain action. Various situations are discussed below in which processors enter a "wait" state. The stimuli include:
1. Arrival of a lock request (OP) input from an attached host.
2. A lock request (OP) input arriving at the head of the queue.
3. Arrival of a lock request (LRQ) message from the other adapter.
4. A lock request (LRQ) message arriving at the head of the queue of a particular shared resource's subpart in an adapter's lock table.
5. Arrival of a lock grant (LG) message from the other adapter.
6. Arrival of a lock release (LRL) message from the other adapter.
7. Receipt of a DONE input from an attached host.
8. Receipt of an ABORT input from attached host.

Figure 4B:
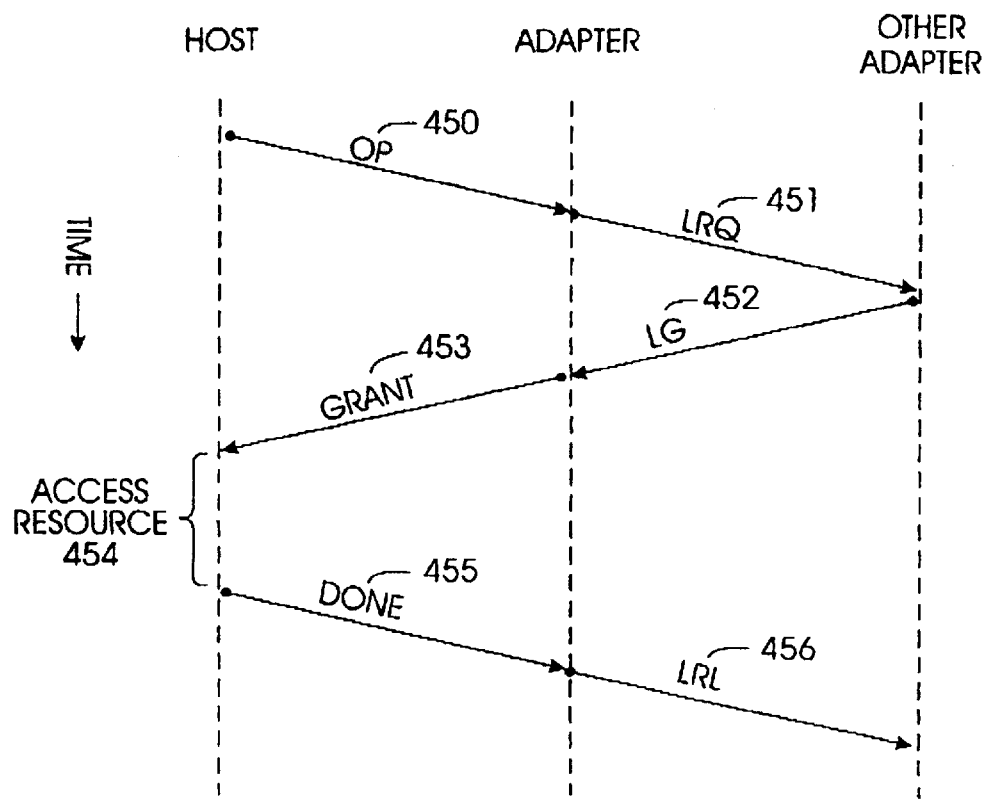
FIG. 4B is a time-based event diagram illustrating an exemplary exchange of signals during the process of acquiring a lock, in accordance with the invention.

FIG. 4B shows a time-based event diagram illustrating an exemplary exchange of signals during the process of acquiring a lock that is in FREE state. In this example, the passage of time is shown along a vertical axis, such that later events occur further downward and earlier events occur further upward in the diagram.

The first event occurs when a host sends a lock request input (OP) 450 to its adapter. The lock request input identifies a shared resource subpart by specifying a desired address range (not shown) of the shared resource. In response to the OP 450, the adapter sends a lock request (LRQ) message 451 to the other adapter, requesting a lock on the desired address range. In response to the LRQ 451, the second adapter returns a lock grant message (LG) 452.

When the first adapter receives the LG 452, it notifies its host that the lock has been granted by sending the host an OP GRANT message 453. When the host learns that its lock is in place, it accesses the shared resource during a time period 454. When the host finishes accessing the shared resource, it sends a DONE input 455 to the adapter. The adapter responds to the DONE input 455 by returning a lock release (LRL) message 456 to the second adapter, thereby relinquishing the lock on the present address range.

The communications protocol described above involves a minimum number of exchanges between the adapters, and thereby contributes to efficient system operation. Specifically, the process of one adapter obtaining and then relinquishing a lock-is achieved with three inter-adapter messages: LRQ, LG, and finally LRL.

Furthermore, the use of the lock release message provides a number of advantages. First, this message helps conserve space in the lock-table, the contents of which are discussed below. Namely, after a lock release operation, the released address range may be deleted from the lock table entirely, thereby conserving lock table space. In addition, the LRL message is conducive to fault tolerance of the system. In particular, by releasing locks in this manner, an adapter that fails is less likely to be holding the lock on an address range. Thus, recovery is expedited since it need not involve the failed adapter.

As another advantage of the foregoing communications protocol, no inter-adapter communications are required if the second adapter is not waiting for a lock on the subject address range. As discussed below, the first adapter need not issue the LRL message if the second adapter is not waiting for the lock. In this case, the first adapter can repeatedly perform the following sequence: receive OP from host, issue a GRANT of the OP, permit host to access resource, and receive DONE input. Thus, no inter-adapter communications are required at all.

Format of Lock Table

Table 1 (below) shows the various components of an exemplary lock table associated with one adapter. As shown in Table 1, the lock table contains one row for each address range (subpart) represented in the table, with each row listing the lock state, current token, and pending queue for that address range. The head of the queue in this example is the leftmost entry, with the end of the queue being the rightmost entry. If an address range has state FREE, it need not appear explicitly in the table unless its queue is non-empty. This helps conserve storage space.

TABLE 1

Exemplary Lock Table

| ADDRESS RANGE [X] | LOCK STATE [STATE(X)] | CURRENT TOKEN [CURRENT(X)] | QUEUE [QUEUE(X)] |
|---|---|---|---|
| A1: 10–1024 bytes | LOCAL | Y1 | (LRQ, A1, W1) |
| A2: 1025–2048 bytes | FREE | none | (OP, A2, 0) |
| A3: 2049–4096 bytes | LOCAL | Y2 | (OP, A3, Y2), (OP, A3, 0) |
| A4: 4097–5120 bytes | REMOTE | W2 | (OP, A4, Y3) |
| A5: 5121–6144 bytes | REQ | Y4 | (OP, A5, Y4) |
| A6: 9520–9590 bytes | FREE | none | empty |

The "lock state" column expresses the address range's lock state for the adapter owing the lock table, these states being FREE, REMOTE, LOCAL, or REQ. The "current token" column shows a present "token" for the associated address range. The token is a sequential code, such as an alphabetic, alphanumeric, or numeric code. Generally, as explained in greater detail below, tokens are used to uniquely identify messages, for example to ensure that a lock grant is issued specifically in response to a particular lock request. The "queue" column contains an ordered list of pending inputs and queued messages concerning the associated address range.

Perspective

With the foregoing background set forth, the following description illustrates a number of different operating sequences. Each sequence is performed by an adapter whenever that adapter receives certain stimuli. The adapters have like construction, and each is capable of performing any of the sequences, depending on the received stimuli. The following examples are discussed from the perspective of a "current" adapter that is performing the sequence, where the remaining adapter is called the "other" adapter.

Arrival of OP Input

Figure 5:
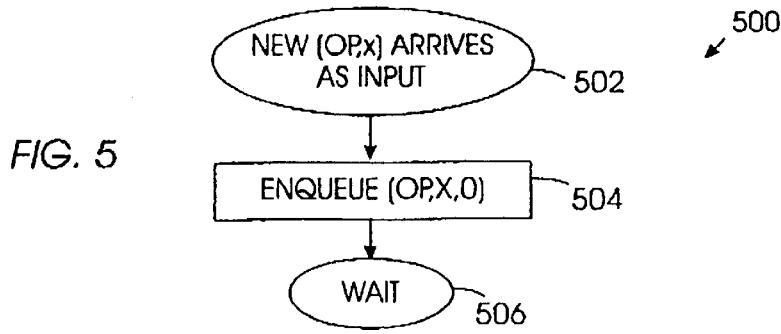
FIG. 5 is a flowchart depicting a sequence performed by a processor when a new local request for a lock (OP) arrives, in accordance with the invention.

FIG. 5 describes the sequence 500 that an adapter performs in response to stimuli in the form of a host lock request input (OP). In step 502, the adapter receives a host lock request input (OP). In the illustrated example, the input arrives in the form (OP, X), where "X" identifies the one of the subparts (address ranges) of shared storage 155. The message of step 502 is generated by the adapter in response to a host request for a lock on the address range "X."

In step 504, the adapter enqueues the input by storing it in the adapter's lock table, at the end of the queue associated with the address range "X." This queue may be called "Queue(X)." The input is enqueued in the format (OP, X, 0), where OP represents the local lock request input, "X" identifies the address range, and "0" is a dummy token for the operation. The use of the dummy token is explained in greater detail below.

If there is no table entry for the address range X, step 504 creates the necessary table entry. After step 504, the adapter waits (step 506) for new stimuli.

OP Input Arrives at Head of Queue

Figure 6:
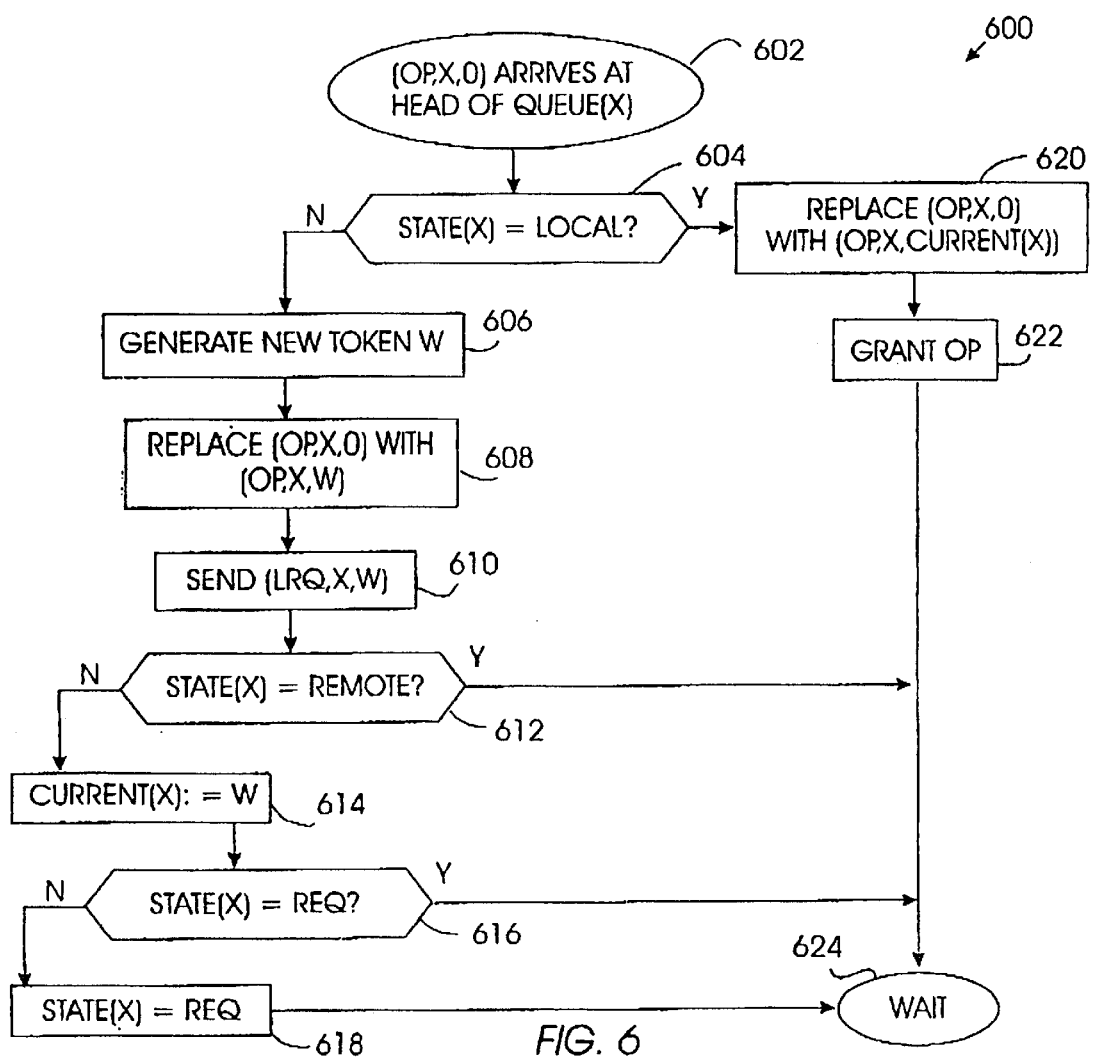
FIG. 6 is a flowchart depicting a sequence performed by a processor when a queued local request for a lock (OP) arrives at the head of the queue, in accordance with the invention.

FIG. 6 describes the sequence 600 that an adapter performs in response to stimuli in the form of a local lock request input (OP) arriving at the head of the queue for a particular address range. In step 602, the operation (OP, X, 0) arrives at the head of the queue for the address range "X," i.e., Queue(X). This operation will reside at the head of the queue for the address range X until the adapter receives a DONE or an ABORT input for the same address range X.

After step 602, the adapter asks whether the state of the address range X is LOCAL (step 604). If so, then the current adapter already owns the lock on the requested address range. In this case, step 620 replaces the operation's dummy token with the "current token." The current token for the address range X is obtained from the adapter's lock table; in the present example, each address range's current token is listed in the column "Current(X)."

After step 620, with the adapter owning the lock on the address X, the adapter grants the local operation in step 622, meaning that the requesting host is given access to the address range X. (This is also shown by the operation 453 in FIG. 4B.) After step 622, the routine 600 progresses to step 624, where the adapter enters a wait state 624, awaiting another one of the prescribed stimuli.

In contrast to the foregoing description, if step 604 finds that the state of address range X is not LOCAL, then the current adapter does not own the lock on the requested address range. Namely, the state of address range X is either FREE, REMOTE, or REQ. In this event, step 606 is performed rather than step 620. Step 606 generates a new token, referred to as "W." After generating the new token W, step 608 replaces the dummy token of the operation at the head of the queue with the new token W. Thus, (OP, X, 0) is replaced by (OP, X, W). Next, in step 610 the adapter sends a lock request to the other adapter so that the current operation (OP, X, W) can be completed. The lock request has the form (LRQ, X, W).

After step 610, step 612 asks whether the state of the address range X is REMOTE. If so, step 612 advances to the wait state 624, where the current adapter proceeds to wait for the other adapter to grant the requested lock. If step 612 finds that the state of the address range X is not REMOTE, the only remaining states are FREE and REQ. In either event, step 614 updates the address range X's entry in the lock table to reflect the new token W. After the table is updated to show W as Current(X), step 616 asks whether the address range X's state is REQ. If so, control advances to the wait state 624. If the address range's state is not REQ, the only remaining state is FREE. In this event, step 618 changes X's state from FREE to REQ, and then progresses to step 624.

Arrival of LRQ Message

Figure 7:
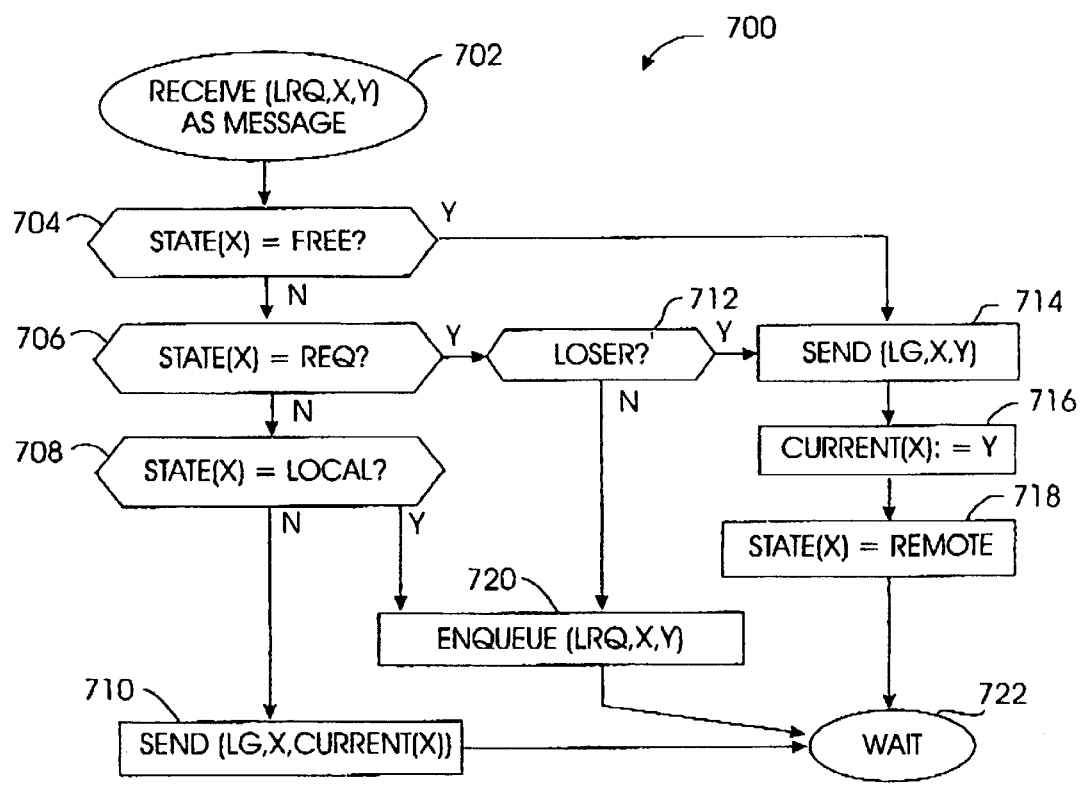
FIG. 7 is a flowchart depicting a sequence performed by a processor when a lock, request (LRQ) message arrives, in accordance with the invention.

FIG. 7 describes the sequence 700 that an adapter performs in response to stimuli comprising receipt of a lock request message (LRQ) from the other adapter. In step 702, the adapter receives a lock request message in the form (LRQ, X, Y). This message comprises a lock request, concerning the address range X, and includes the token Y.

After step 702, step 704 asks whether the state of the identified address range at the current adapter is FREE. If so, step 714 grants the lock request to the other adapter by sending the lock grant message (LG, X,, Y). This message includes a token (Y) matching the lock request's token. After step 714, step 716 updates the current token shown in the sending adapter's lock table (Current(X)), to reflect the token Y used in the lock request and grant messages. Following step 716, step 718 performs the internal bookkeeping necessary for the adapter to surrender the lock on the address range X. Namely, step 718 updates the adapter's lock table to show the state of address range X as REMOTE. After step 718, the routine 700 ends, with the adapter going into a wait state 722, pending arrival of the next stimuli.

In contrast, if the state of the address range X is not FREE, steps 706 and 708 proceed to ask whether the state is REQ or LOCAL. If the state is REQ, this means that the current adapter already has a request in progress for a lock on the address range X. In this case, both adapters are seeking locks on the same address range. Accordingly, step 712 performs arbitration to decide between the two adapters. The arbitration of step 712 may be achieved utilizing any mechanism having a fixed, unambiguous outcome that both adapters can reach without any intercommunication. As an example, the arbitration may be performed by permanently designating one adapter as the "winner," and the other as the "loser."

If the adapter performing step 700 is the loser, step 714 grants the lock to the other adapter, updates the current token, and sets, the state of the address range X to REMOTE, as discussed above in steps 714, 716, and 718. On the other hand, if the adapter performing step 700 is the winner, step 712 proceeds to step 720, which enqueues the other adapter's lock request. This is performed by entering (LRQ, X, Y) in the queue column corresponding to the address range X. In the present example, operations are enqueued by placing them at the tail of the queue. However, enqueuing may alternatively be achieved by placing LRQ operations at the number-two position in the queue, the number-three position, or another predesignated position. Insertion at the number-one position (head of the queue) is avoided to prevent thrashing.

If step 708 finds that the state is LOCAL, step 720 enqueues the received lock request messages by storing (LRQ, X, Y) in the lock table row corresponding to the address range X. After step 720, the adapter proceeds to step 722, where it awaits further stimuli.

If step 708 finds that the state is not LOCAL, steps 704 and 706 dictate that the state must be REMOTE, such that the other adapter owns the lock on the address range X. In this case, the two adapters are confused as to which adapter owns the lock on the address range X. In this event, step 710 grants the lock to the other adapter by sending (LG, X, Current(X)). Following step 710, the routine 700 ends, with the adapter going into a wait state 722, awaiting the next stimulus.

LRQ Arrives at Head of Queue

Figure 8:
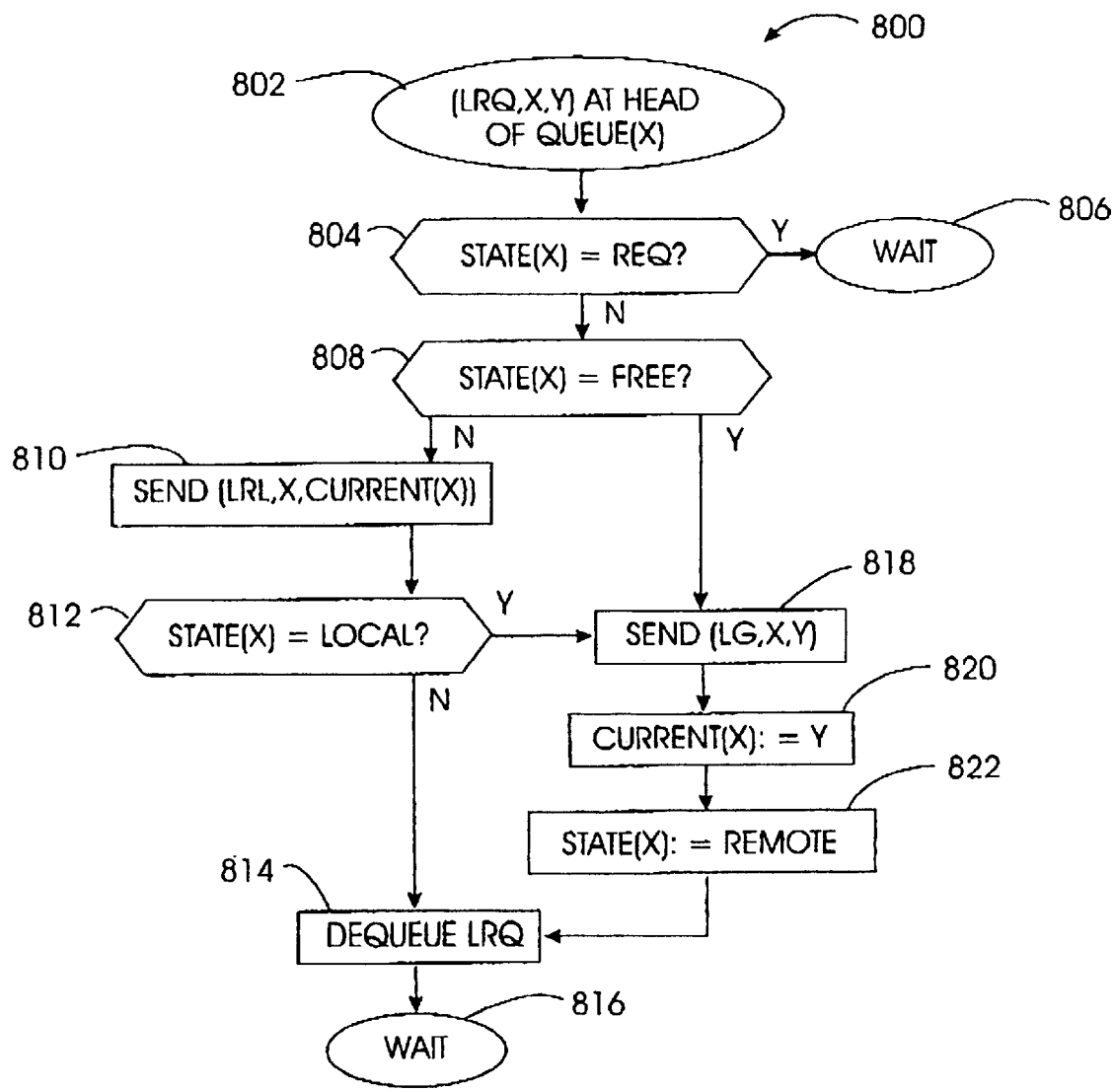
FIG. 8 is a flowchart depicting a sequence performed by a processor when an enqueued lock request (LRQ) arrives at the head of the queue, in accordance with the invention.

FIG. 8 describes the sequence 800 that an adapter performs in response to stimuli comprising arrival of an enqueued lock request message (LRQ) at the head of the queue. In step 802, the lock request message (LRQ, X, Y) originating from the other adapter arrives at the head of the queue in the current adapter's lock table. In response, step 804 asks whether the state of the address range X is REQ. If so, the current adapter already has its own request for the lock in progress, so the adapter waits in step 806 to give its own request time to complete.

If the state is not REQ, step 808 asks whether the state is FREE. If so, step 818 grants the lock to the other adapter, by sending a lock grant message (LG, X, Y). Following step 818, step 820 sets the lock table to show Y as the current token for the address range. Step 822 then sets the lock table to show REMOTE as the state of the address range X. Following step 822, step 814 removes the lock request message from the queue, and then the adapter waits for further stimuli in step 816.

In contrast, if the state is neither REQ nor FREE, the state must be REMOTE or LOCAL. In either case, step 808 advances to step 810, which sends the other adapter a lock release message (LRL, X, Current(X)). Following step 810, step 812 asks whether the state of the address range X is LOCAL. If so, the current adapter owns the lock on the address range X. In this case, the adapter proceeds to relinquish the lock to the other adapter. This is performed to ensure fair access to the address range X between the two adapters, preventing the local adapter from continually monopolizing the lock. More particularly, after an affirmative answer to step 812, the adapter grants the lock, updates the token, and marks its own state as REMOTE. These tasks are performed in steps 818, 820, 822, the details of which are discussed above.

If the address range X's state is not REQ, FREE, or LOCAL, it must be REMOTE, by the process of elimination. Therefore, the other adapter already owns the lock on the address range X, and the enqueued lock request id in error. In this event, step 812 proceeds to step 814, which deletes the lock request (LRQ, X, Y) from the current adapter's queue, and proceeds to wait for the next stimulus in step 816.

Arrival of LG Message

Figure 9:
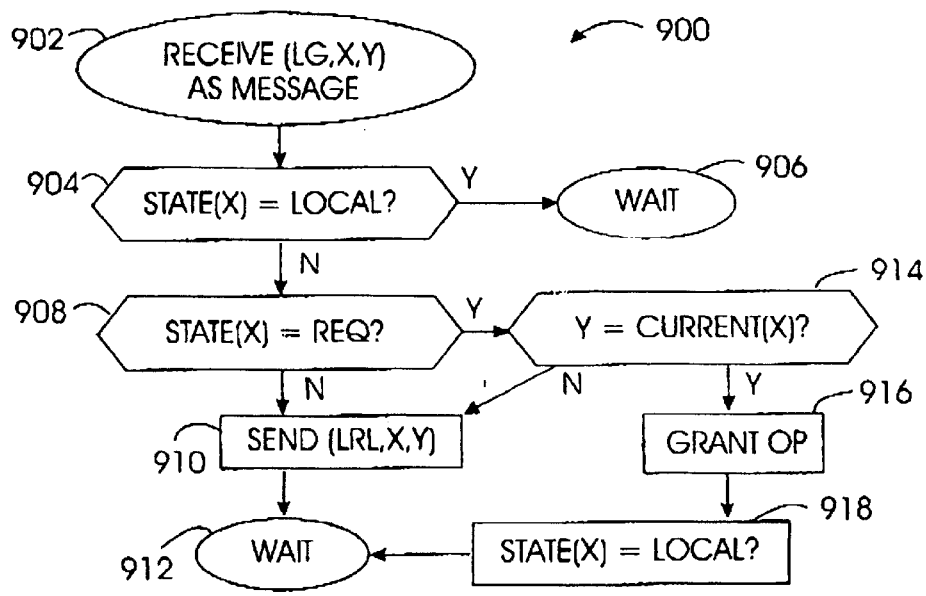
FIG. 9 is a flowchart depicting an sequence performed by a processor when a lock grant (LG) message arrives, in accordance with the invention.

FIG. 9 describes the sequence 900 that an adapter performs in response to stimuli comprising the receipt of a lock grant message (LG) from the other adapter. Namely, in step 902, the current adapter receives a lock grant message (LG, X, Y). Step 904 asks if the state of the address range X is LOCAL. If so, the lock grant is meaningless, since the current adapter already owns the lock. In this case, the lock grant message is in error, and the current adapter proceeds to wait for the next stimulus in step 906.

If the state is not LOCAL, step 908 asks if a request is in progress, i.e., the state is REQ. If no request is in progress, the lock is unneeded, and this situation may have arisen due to lost or misordered messages. In this case, the current adapter relinquishes the lock already granted. Specifically, step 910 returns a lock release message (LRL, X, Y) to the other adapter. After step 910, the current adapter goes into a wait state 912.

On the other hand, if step 908 finds a request in progress, step 914 asks whether the token of the lock request matches the current token (Current(X)) for the address range X. If so, the current adapter's lock request has been properly granted. In this case, the adapter in step 916 grants the operation at the head of the queue. In other words, the host source of the operation (OP) is given access to the address range X (as in step 622). After step 916, step 918 sets the state of the address range X to LOCAL, and then enters the wait state in step 912.

Arrival of LRL Message

Figure 10:
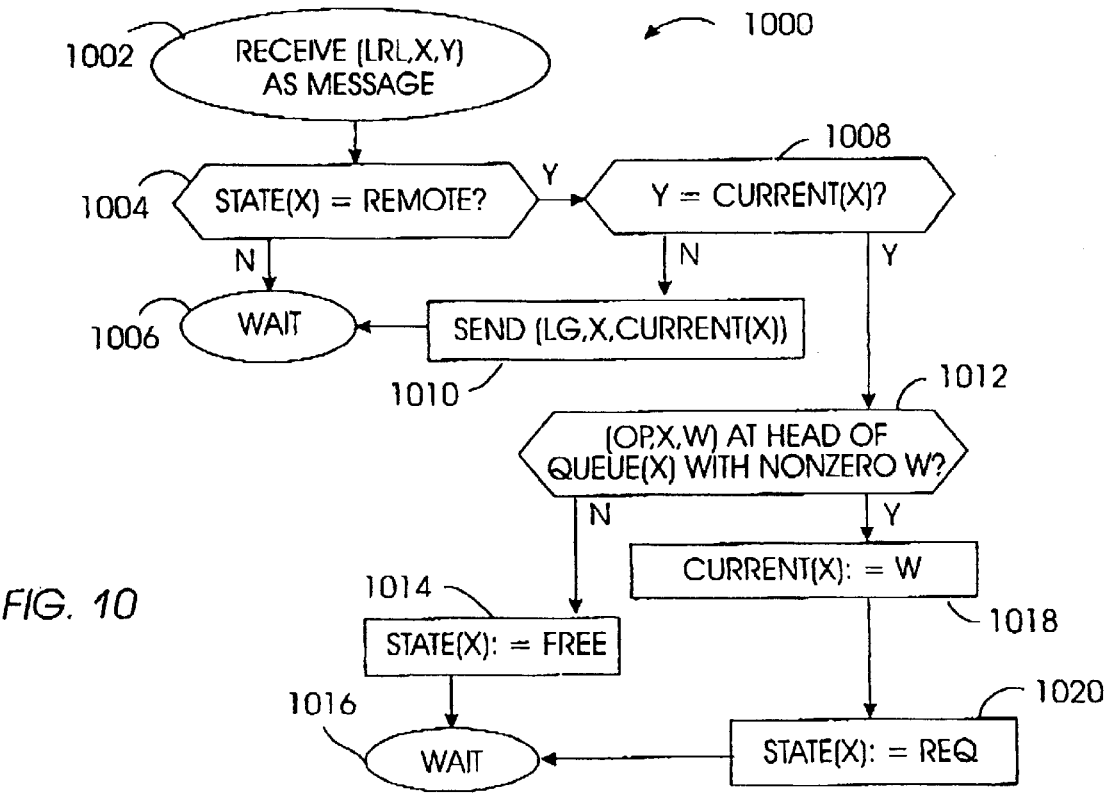
FIG. 10 is a flowchart depicting an sequence performed by a processor when a lock release (LRL) message arrives, in accordance with the invention.

FIG. 10 describes the sequence 1000 that an adapter performs in response to stimuli comprising receipt of a lock release message (LRL) from the other adapter. In step 1002, the current adapter receives a lock release message (LRL, X, Y), originating from the other adapter. In response, step 1004 asks whether the state of the address range X is REMOTE, the only state within which the adapter would expect to receive a lock release message. If the state is not REMOTE, then the lock release is discarded, and the adapter proceeds to the wait state 1006.

On the other hand, if the state is REMOTE, then a lock release is expected, but it is still necessary to verify that the lock release's token matches the address range's current token. In this case, step 1008 asks whether the token Y of the received (LRL, X, Y) matches Current(X). If not, step 1010 grants the lock to the other adapter by sending it (LG, X, Current(X)). This LG will prompt the other adapter to send (step 910) a matching (LRL, X, Current(X)) in case the non-matching LRL is the result of lost messages and the other adapter does not have X in state LOCAL. This is an example of a response designed to recover from and tolerate intermittent communication failures. After step 1010, the routine 1000 proceeds to the wait step 1006.

If the tokens match, however, step 1012 asks whether the operation pending at the head of the address range X's queue contains a local lock request with a valid, non-dummy token. If not, then there is no local operation awaiting the lock and the lock release message (LRL) results in freeing of the address range. Specifically, the adapter sets the address range's state to FREE in step 1014. If the head of the address range X's queue does contain a local lock request with a valid token, step 1018 updates the current adapter's current token to match the queued local lock request's token. In this example, the host's lock request is (OP, X, W), and the current token is updated to token W. Since the current adapter presumably had sent (LRQ, X, W) in step 610, steps 1018 and 1020 prepare the adapter to receive the matching (LG, X, W) that will be sent by the other adapter in step 818 when (LRQ, X, W) reaches the head of its queue for X (Queue(X)). After step 1018, step 1020 sets the address range's state to REQ, and then proceeds to wait in step 1016.

Receipt of DONE Condition

Figure 11:
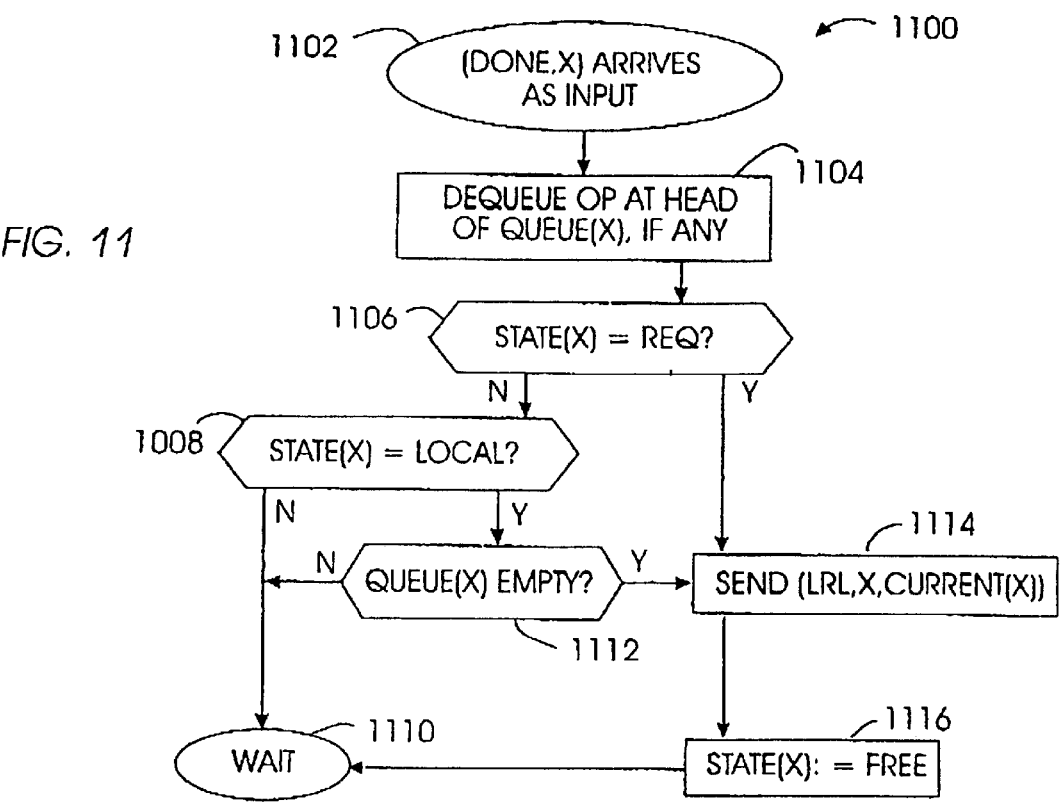
FIG. 11 is a flowchart depicting an sequence performed by a processor when a completion input (DONE) arrives, in accordance with the invention.

FIG. 11 describes the sequence 1100 that an adapter performs in response to stimuli comprising arrival of a DONE input. In step 1102, the adapter receives an input (DONE, X). This input arrives from the host when it completes its current operation on the address range X, or it is generated by the current adapter because of a timeout or another condition requiring an operation in progress to abort.

After step 1102, step 1104 deletes local lock request (OP) at the head of the address range X's queue. Then, step 1106 asks whether the address range's state is REQ. If so, the current adapter in step 1114 sends the other adapter a lock release message (LRL, X, Current(X)), sets the address range's state to FREE (step 1116), and enters the wait state 1110.

If the address range X's state is not REQ, step 1108 asks whether the state is LOCAL. If the state is LOCAL, step 1112 asks whether the queue for the address range X is empty. If the queue is not empty, the sequence 1100 enters the wait state 1110. If the queue is empty, however, the current adapter sends the other adapter a lock release message (LRL, X, Current(X)) (step 1114), sets the address range's state to FREE (step 1116), and enters the wait state 1110. This method allows the current adapter to perform multiple operations on the same address range without the need to exchange any messages with the other adapter.

In contrast to the foregoing description, if steps 1106, 1108 find that the state is neither REQ nor LOCAL, then the operation has already completed and this DONE is redundant. In this case, the sequence 1100 waits in step 1110.

Receipt of ABORT Condition

Figure 12:
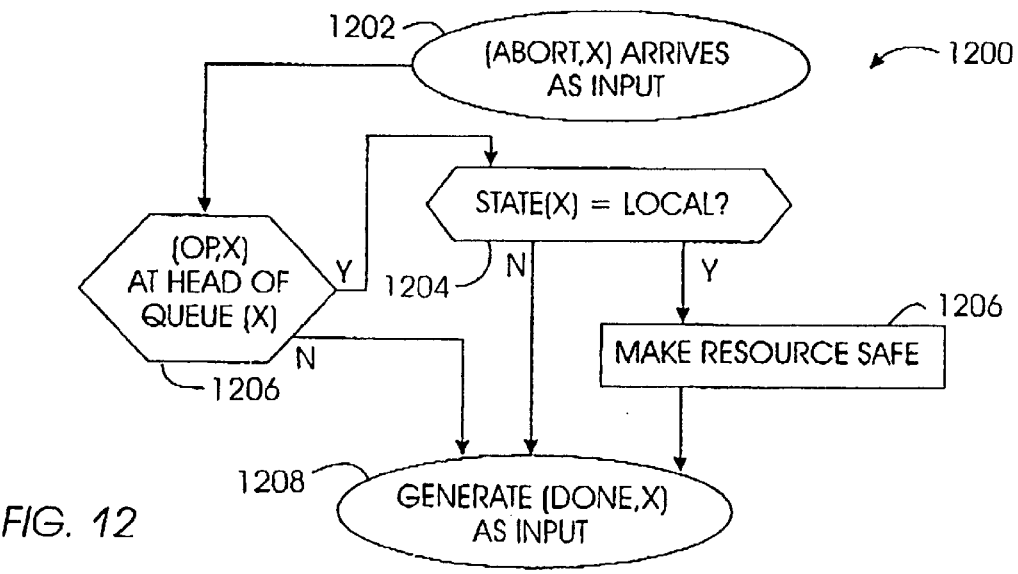
FIG. 12 is a flowchart depicting an sequence performed by a processor when an error input (ABORT) arrives, in accordance with the invention.

FIG. 12 describes the sequence 1200 that an adapter performs in response to stimuli comprising arrival of an abort input. In step 1202, the adapter receives an (ABORT, X) input, originating from one of the adapter's hosts. The ABORT input may result from various conditions, such as a timeout, failure of an adapter, failure of inter-adapter communications, loss of power, etc. After step 1202, step 1206 asks whether the received abort input is directed at the local lock request operation (OP) at the head of the queue. If not, the adapter generates a DONE input in step 1208. Otherwise, step 1204 asks whether the address range X's state is LOCAL. If so, step 1206 takes steps to make the shared resource 155 "safe," e.g., consistent, complete, etc. In the case of a data storage resource, step 1206 may complete the operation in progress, reverse stored data back to a previous state, calculate parity, etc. After step 1206, step 1208 generates (DONE, X) as input.

If step 1204 finds a state other than LOCAL, then the operation to be aborted has not started and cannot have placed the resource in an unsafe (incomplete) condition. In this case, the routine 1200 generates (DONE, X) as input in step 1208.

Additional Features Supporting Liveness

The invention may also provide various features to help ensure the "liveness" of the processing system. Liveness refers to the system's robust resistance to hanging up or otherwise becoming inoperative due to a failure of a subcomponent. As shown below, these liveness features include a "retry" facility and a "timeout" facility.

The retry facility may be implemented by various measures to ensure that lock requests are eventually repeated. As one example, the adapters may be programmed to review their lock tables for address ranges that are in the REQ or REMOTE state, and have an OP input with a valid token at the head of the queue. This situation indicates that the pending OP input is waiting for the lock. The lock table review may be conducted periodically, whenever a new OP input is received, or on another sufficiently frequent basis.

As another alternative, each adapter may associate a timer with each LRQ message sent. In this embodiment, the adapter resends the LRQ message if the lock is not granted before the timer expires.

In contrast to the retry facility, the timeout facility is provided to help tolerate failures in host-adapter interaction. Such failure situations may arise from a failed host, a failed shared resource, etc. The timeout facility associates a timer with each new host lock request input (OP). The timer may be initiated, for example, as part of step 504 (FIG. 5). The timer is satisfied (and thus removed) whenever the OP message completes to fruition (marked by the host submitting a DONE input). Removal of the timer may occur, for instance, in step 1104 (FIG. 11). If the timer runs out before completing successfully, the timer causes an ABORT input to be issued. This prevents starving of the other adapter and its hosts due to an unresponsive adapter, host, or address range.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for managing access to a shared resource in a computing system, including multiple processors each coupled to the shared resource, the processors being coupled to one or more hosts, the method comprising operations of:

each processor separately storing a corresponding lock table listing one or more subparts of the shared resource, where each lock table also lists in association with each subpart a state selected from a state group including a LOCAL state and a REMOTE state;

in response to an access request from one of the hosts, the access request identifying one or more subparts of the shared resource, the processors awarding a lock on all identified subparts by electing a single processor to have exclusive access to the identified subparts;

wherein the awarding of a lock for one or more subparts comprises the processors exchanging one or more messages from a group including lock request and lock grant, each lock request message including a newly generated token to distinguish the lock request from other lock requests, each lock grant message including a token from a lock request being granted thereby;

wherein the exchanging of messages comprises each processor applying predetermined operations to cooperate with other processors in awarding locks, the predetermined operations comprising:

responsive to a processor receiving a lock request message and associated token concerning a specified subpart of the shared resource when the receiving processor's lock table shows a REMOTE state associated with specified subpart, the receiving processor returning a lock grant message including a token from a lock grant message originally granting a lock on the specified subpart causing the shared resource to enter the REMOTE state;

in response to the election, at a first time all non-lock-holding processors configuring their lock tables to show the identified subparts in the REMOTE state, and no earlier then the first time the lock-holding processor configuring its lock table to show the identified subpart in the LOCAL state; and each processor refraining from accessing a subpart of the shared resource unless the processor's lock table indicates a LOCAL state for that subpart.

2. The method of claim 1, the lock-holding processor configuring its lock table to show the identified subpart in the LOCAL state after the first time.

3. The method of claim 1, each processor storing its corresponding lock table in non-volatile storage.

4. The method of claim 1, the shared resource comprising one or more digital data storage devices.

5. The method of claim 1, the processors of the system being two in number.

6. The method of claim 1, the processors of the system being two in number, and including first and second processors, the electing operation including:

responsive to the first processor receiving a request to access a particular subpart, where the first processor's lock table indicates a REMOTE state for that subpart, the first processor transmitting a lock request message to the second processor;

responsive to receipt of a lock request message concerning the subpart, the second processor configuring its lock table to indicate the REMOTE state for the identified subpart and then transmitting a lock grant message to the first processor; and responsive to receipt of a lock grant message concerning the subpart, the first processor configuring its lock table to show a LOCAL state for the identified subpart.

7. The method of claim 6, and the operations further comprise:

the first processor determining whether tokens of the lock request and lock grant messages match, and if not, aborting the operation of configuring the first processor's lock table to show a LOCAL state for the subpart.

8. The method of claim 1, where the state group further includes a FREE state.

9. The method of claim 8, where the electing operation further includes:

responsive to a processor completing access to a subpart of the shared resource, the processor transmitting a lock release message to the other processors, and then each processor configuring its lock table to indicate the FREE state for the subpart.

10. The method of claim 9, where the configuring of the lock table to indicate the FREE state comprises the processor removing the representation of the subpart from the lock table.

11. The method of claim 8, the processors of the system being two in number, and including first and second processors, the electing operation comprising:

the first processor transmitting a lock request message to the second processor, the lock request naming the identified subpart of the shared resource;

the second processor consulting its lock table to determine the state of the identified subpart, and in response to the lock table indicating a FREE state of the subpart, the second processor transmitting a lock grant message to the first processor, and then configuring the second processor's lock table to show a REMOTE state for the identified subpart; and the first processor receiving the lock grant message, and in response configuring the first processor's lock table to show a LOCAL state for the identified subpart.

12. The method of claim 1, the processors of the system being two in number, and including first and second processors, the electing operation including:

responsive to the first processor receiving a request to access a particular subpart, where the first processor's lock table indicates a REMOTE state for that subpart, the first processor transmitting a lock request message to the second processor;

responsive to the first processor failing to receive a lock grant message within a predetermined time, the first processor retransmitting the lock request message to the second processor.

13. The method of claim 1, the processors of the system being two in number, and including first and second processors, the electing operation including:

responsive to the first processor receiving a request to access a subpart, where the first processor's lock table indicates a REMOTE state for that subpart, the first processor transmitting a lock request message to the second processor;

responsive to the lock request message, the second processor representing the lock request in a queue;

the second processor sequentially processing queued messages, and upon reaching the queued lock request, the second processor configuring its lock table to indicate the REMOTE state for the subpart and then transmitting a lock grant message to the first processor; and responsive to receipt of a lock grant message concerning an identified subpart, the first processor configuring its lock table show a LOCAL state for the identified subpart.

14. The method of claim 1, the processors being two in number, and including first and second processors, the operations further comprising:

responsive to the first processor receiving a host request to access a first subpart of the shared resource while the lock table of the first processor shows the first subpart in the REMOTE state, the first processor transmitting a lock request message to the second processor in association with the first subpart.

15. The method of claim 14, further comprising:

the first processor retransmitting the lock request to the second processor according to a predetermined schedule until the second processor grants the requested lock on the first subpart.

16. The method of claim 14, where:

each processor maintains a queue of pending operations; and responsive to the lock request, the second processor places a representation of the lock request in the queue of the second processor.

17. The method of claim 1, where:

the processors maintain respective queues of pending operations, and where each processor is responsive to host requests to access a subpart of the shared resource while the lock table of the processor shows the subpart in the REMOTE state by sending a lock request message to the other processors; and the electing operation comprises, responsive to a processor's receipt of an access request from one of the hosts involving a first subpart of the shared resource, determining whether the lock table of the processor lists the subpart in the LOCAL state and the processor's queue is free from any lock requests from other processors, and if so, the processor proceeding to satisfy the host access request without sending any messages to the other processor.

18. The method of claim 1, further comprising:

in response to a processor receiving a host access request, the processor setting a timer, satisfied by completion of the host access request; and responsive to unsatisfied expiration of the timer, the processor aborting the host access request.

19. The method of claim 1, where:

the processors maintain respective sequential queues of pending operations;

the processors are two in number, and include first and second processors, one of the processors being predesignated as a winner and the other being predesignated as a loser; and responsive to each processor receiving a lock request from the other processor, where each processor has sent an unsatisfied lock request to the other processor, the loser processor granting a lock on the subpart to the winner processor, and the winner processor waiting for the lock grant and enqueing the loser processor's lock request.

20. The method of claim 1, where the operation of storing lock tables is performed such that each lock table lists in association with each subpart:
a token;
a state selected from a state group including LOCAL, REQ, FREE, REMOTE;
wherein the predetermined operations further comprise:
responsive to a processor receiving a lock request message and associated token concerning a specified subpart of the shared resource when the receiving processor's lock table shows a FREE state associated with specified subpart, the receiving processor returning a lock grant message including the associated token, updating the processor's lock table to list the specified subpart in association with the REMOTE state and the associated token;
responsive to a processor receiving a lock request message and associated token concerning a specified subpart of the shared resource when the receiving processor's lock table shows a REQ state associated with specified subpart, the receiving processor participating in a predetermined dispute resolution procedure against a processor that submitted the lock request message, and
if the processor wins the procedure, placing the received lock in queue for later handling by the receiving processor;
if the processor loses the procedure, the receiving processor returning a lock grant message including the associated token, updating the processor's lock table to indicate the, updating the processor's lock table to list the specified subpart in association with the REMOTE state and in association with the associated token;
responsive to a processor receiving a lock request message and associated token concerning a specified subpart of the shared resource when the receiving processor's lock table shows a LOCAL state associated with specified subpart, the receiving processor placing the received lock in queue for later handling by the receiving processor.

21. The method of claim 1, where the operation of storing lock tables is performed such that each lock table lists in association with each subpart:
a token;
a state selected from a state group including LOCAL, REQ, FREE, REMOTE;
wherein the predetermined operations further comprise:
responsive to a processor receiving from each other processor at least one lock grant message and associated token concerning a specified subpart of the shared resource when the receiving processor's lock table shows a REQ state associated with specified subpart, the receiving processor performing operations comprising:
if each of the associated tokens matches the token for the specified subpart shown in the lock table, commencing the host access request and updating the processor's lock table to list the specified subpart in association with the LOCAL state and the associated token;
if the associated token does not match the token for the specified subpart shown in the lock table, sending a lock release message identifying the specified subpart and the associated token;
responsive to a processor receiving a lock grant message and associated token concerning a specified subpart of the shared resource when the receiving processor's lock table shows a REMOTE or FREE state associated with specified subpart, the receiving processor sending a lock release message identifying the specified subpart and the associated token.

22. The method of claim 1, where the operation of storing lock tables is performed such that each lock table lists in association with each subpart:
a token;
a state selected from a state group including LOCAL, REQ, FREE, REMOTE;
wherein the predetermined operations further comprise, responsive to a processor receiving a lock release message and associated token concerning a specified subpart of the shared resource when the receiving processor's lock table shows a REMOTE state associated with specified subpart, the receiving processor performing operations comprising:
only if the associated token does not match the token for the specified subpart shown in the lock table, the receiving processor returning a lock grant message including the token for the specified subpart shown in the lock table.

23. A signal-bearing medium tangibly embodying a program of machine-readable instructions executable by a digital data processing machine to perform operations to manage one processor in a multiple processor computing system, the processors having access to a shared resource, the operations comprising:

the processor storing a lock table listing one or more subparts of the shared resource, the lock table also listing in association with each subpart a state selected from a state group including a LOCAL state and a REMOTE state;

in response to an access request from one of the hosts, the access request identifying one or more subparts of the shared resource, the processor cooperating with the other processors to award a lock on all identified subparts by electing a single processor to have exclusive access to the identified subparts;

wherein the awarding of a lock for one or more subparts comprises the processors exchanging one or more messages from a group including lock request and lock grant, each lock request message including a newly generated token to distinguish the lock request from other lock requests, each lock grant message including a token from a lock request being granted thereby;

wherein the exchanging of messages comprises each processor applying predetermined operations to cooperate with other processors in awarding locks, the predetermined operations comprising:
  responsive to a processor receiving a lock request message and associated token concerning a specified subpart of the shared resource when the receiving processor's lock table shows a REMOTE state associated with specified subpart, the receiving processor returning a lock grant message including a token from a lock grant message originally granting a lock on the specified subpart causing the shared resource to enter the REMOTE state;
  in response to the election,
    if the processor is not elected, the processor configuring its lock table to show the identified subpart in the REMOTE state;
    if the processor is elected, the processor configuring its lock table to show the identified subpart in the LOCAL state; and
  the processor refraining from accessing a subpart of the shared resource unless the processor's lock table indicates the LOCAL state for that subpart.

24. The medium of claim 23, the processor storing its lock table in non-volatile storage.

25. The medium of claim 23, the shared resource comprising one or more digital data storage devices.

26. The medium of claim 23, the processors of the system being two in number.

27. The medium of claim 23, where the state group further includes a FREE state.

28. The medium of claim 23,
where the operation of storing lock tables is performed such that each lock table lists in association with each subpart:
  a token;
  a state selected from a state group including LOCAL, REQ, FREE, REMOTE;
wherein the predetermined operations further comprise:
  responsive to a processor receiving a lock request message and associated token concerning a specified subpart of the shared resource when the receiving processor's lock table shows a FREE state associated with specified subpart, the receiving processor returning a lock grant message including the associated token, updating the processor's lock table to list the specified subpart in association with the REMOTE state and the associated token;
  responsive to a processor receiving a lock request message and associated token concerning a specified subpart of the shared resource when the receiving processor's lock table shows a REQ state associated with specified subpart, the receiving processor participating in a predetermined dispute resolution procedure against a processor that submitted the lock request message, and
    if the processor wins the procedure, placing the received lock in queue for later handling by the receiving processor;
    if the processor loses the procedure, the receiving processor returning a lock grant message including the associated token, updating the processor's lock table to indicate the, updating the processor's lock table to list the specified subpart in association with the REMOTE state and in association with the associated token;
  responsive to a processor receiving a lock request message and associated token concerning a specified subpart of the shared resource when the receiving processor's lock table shows a LOCAL state associated with specified subpart, the receiving processor placing the received lock in queue for later handling by the receiving processor.

29. The medium of claim 23,
where the operation of storing lock tables is performed such that each lock table lists in association with each subpart:
  a token;
  a state selected from a state group including LOCAL, REQ, FREE, REMOTE;
wherein the predetermined operations further comprise:
  responsive to a processor receiving from each other processor at least one lock grant message and associated token concerning a specified subpart of the shared resource when the receiving processor's lock table shows a REQ state associated with specified subpart, the receiving processor performing operations comprising:
    if each of the associated tokens matches the token for the specified subpart shown in the lock table, commencing the host access request and updating the processor's lock table to list the specified subpart in association with the LOCAL state and the associated token;
    if the associated token does not match the token for the specified subpart shown in the lock table, sending a lock release message identifying the specified subpart and the associated token;
  responsive to a processor receiving a lock grant message and associated token concerning a specified subpart of the shared resource when the receiving processor's lock table shows a REMOTE or FREE state associated with specified subpart, the receiving processor sending a lock release message identifying the specified subpart and the associated token.

30. The medium of claim 23,
where the operation of storing lock tables is performed such that each lock table lists in association with each subpart:
  a token;
  a state selected from a state group including LOCAL, REQ, FREE, REMOTE;
wherein the predetermined operations further comprise, responsive to a processor receiving a lock release message and associated token concerning a specified subpart of the shared resource when the receiving processor's lock table shows a REMOTE state associated with specified subpart, the receiving processor performing operations comprising:
  only if the associated token does not match the token for the specified subpart shown in the lock table, the receiving processor returning a lock grant message including the token for the specified subpart shown in the lock table.

31. A multiple processor computing system, comprising:
a shared resource having multiple subparts; and multiple processors coupled to one or more hosts, each processor being coupled to the shared resource, where the processors are programmed to perform operations to cooperatively utilize the resource, the operations comprising:

each processor separately storing a corresponding lock table listing one or more subparts of the shared resource, where each lock table also lists in association with each subpart a state selected from a state group including a LOCAL state and a REMOTE state;

in response to an access request from one of the hosts, the processors awarding a lock on all identified subparts by electing a single processor to have exclusive access to the identified subparts;

wherein the awarding of a lock for one or more subparts comprises the processors exchanging one or more messages from a group including lock request and lock grant, each lock request message including a newly generated token to distinguish the lock request from other lock requests, each lock grant message including a token from a lock request being granted thereby;

wherein the exchanging of messages comprises each processor applying predetermined operations to cooperate with other processors in awarding locks, the predetermined operations comprising:

responsive to a processor receiving a lock request message and associated token concerning a specified subpart of the shared resource when the receiving processor's lock table shows a REMOTE state associated with specified subpart, the receiving processor returning a lock grant message including a token from a lock grant message originally granting a lock on the specified subpart causing the shared resource to enter the REMOTE state;

in response the election, at a first time all non-lock-holding processors configuring their lock tables to show the identified subparts in the REMOTE state, and no earlier then the first time the lock-holding processor configuring its lock table to show the identified subpart in the LOCAL state; and each processor refraining from accessing a subpart of the shared resource unless the processor's lock table indicates a LOCAL state for that subpart.

32. The system of claim 31, the lock-holding processor configuring its lock table to show the identified subpart in the LOCAL state after the first time.

33. The system of claim 31, each processor storing its corresponding lock table in non-volatile storage.

34. The system of claim 31, the shared resource comprising one or more digital data storage devices.

35. The system of claim 31, the processors of the system being two in number.

36. The system of claim 31, the processors of the system being two in number, and including first and second processors, the electing operation including:

responsive to the first processor receiving a request to access a particular subpart, where the first processor's lock table indicates a REMOTE state for that subpart, the first processor transmitting a lock request message to the second processor;

responsive to receipt of a lock request message concerning the subpart, the second processor configuring its lock table to indicate the REMOTE state for the subpart and then transmitting a lock grant message to the first processor; and responsive to receipt of a lock grant message concerning an identified subpart, the first processor configuring its lock table to show a LOCAL state for the identified subpart.

37. The system of claim 36, where the operations further comprise:

the first processor determining whether tokens of the lock request and lock grant messages match, and if not, aborting the operation of configuring the first processor's lock table to show a LOCAL state for the subpart.

38. The system of claim 31, where the state group further includes a FREE state.

39. The system of claim 38, where the electing operation further includes:

responsive to a processor completing access to a subpart of the shared resource, the processor transmitting a lock release message to the other processors, and then each processor configuring its lock table to indicate the FREE state for the subpart.

40. The system of claim 39, where the configuring of the lock table to indicate the FREE state comprises the processor removing the representation of the subpart from the table.

41. The system of claim 38, the processors being two in number, and including first and second processors, the electing operation comprising:

the first processor transmitting a lock request message to the second processor, the lock request naming the identified subpart of the shared resource;

the second processor consulting its lock table to determine the state of the identified subpart, and in response to the lock table indicating a FREE state of the subpart, the second processor transmitting a lock grant message to the first processor, and then configuring the second processor's lock table to show a REMOTE state for the identified subpart; and the first processor receiving the lock grant message, and in response configuring the first processor's lock table to show a LOCAL state for the identified subpart.

42. The system of claim 31, the processors of the system being two in number, and including first and second processors, the electing operation including:

responsive to the first processor receiving a request to access a particular subpart, where the first processor's lock table indicates a REMOTE state for that subpart, the first processor transmitting a lock request message to the second processor;

responsive to the first processor failing to receive a lock grant message within a predetermined time, the first processor retransmitting the lock request message to the second processor.

43. The system of claim 31, the processors being two in number, and including first and second processors, the electing operation including:

responsive to the first processor receiving a request to access a subpart, where the first processor's lock table indicates a REMOTE state for that subpart, the first processor transmitting a lock request message to the second processor;

responsive to the lock request message, the second processor representing the lock request in a queue;

the second processor sequentially processing queued messages, and upon reaching the queued lock request, the second processor configuring its lock table to indicate the REMOTE state for the subpart and then transmitting a lock grant message to the first processor; and responsive to receipt of a lock grant message concerning an identified subpart, the first processor configuring its lock table show a LOCAL state for the identified subpart.

44. The system of claim 31, the processors being two in number, and including first and second processors, the operations further comprising:

responsive to the first processor receiving a host request to access a first subpart of the shared resource while the lock table of the first processor shows the first subpart in the REMOTE state, the first processor transmitting a lock request message to the second processor in association with the first subpart.

45. The system of claim 44, the operations further comprising:

the first processor retransmitting the lock request to the second processor according to a predetermined schedule until the second processor grants the requested lock on the first subpart.

46. The system of claim 44, where:

each processor maintains a queue of pending operations; and responsive to the lock request, the second processor places a representation of the lock request in the queue of the second processor.

47. The system of claim 31, where:

the processors maintain respective queues of pending operations, and where each processor is responsive to host requests to access a subpart of the shared resource while the lock table of the processor shows the subpart in the REMOTE state by sending a lock request message to the other processors; and the electing operation comprises, responsive to a processor's receipt of an access request from one of the hosts involving a first subpart of the shared resource, determining whether the lock table of the processor lists the subpart in the LOCAL state and the processor's queue is free from any lock requests from other processors, and if so, the processor proceeding to satisfy the host access request without sending any messages to the other processor.

48. The system of claim 31, the operations further comprising:

in response to a processor receiving a host access request, the processor setting a timer, satisfied by completion of the host access request; and responsive to unsatisfied expiration of the timer, the processor aborting the host access request.

49. The system of claim 31, where:

the processors maintain respective sequential queues of pending operations;

the processors are two in number, and include first and second processors, one of the processors being predesignated as a winner and the other being predesignated as a loser; and responsive to each processor receiving a lock request from the other processor, where each processor has sent an unsatisfied lock request to the other processor, the loser processor issuing a lock on the subpart to the winner processor, and the winner processor waiting for the lock grant and enqueing the loser processor's lock request.

50. The system of claim 31, where the processors are programmed such that the operation of storing lock tables is performed such that each lock table lists in association with each subpart:

a token;

a state selected from a state group including LOCAL, REQ, FREE, REMOTE;

wherein the processors are programmed such that the predetermined operations further comprise:

responsive to a processor receiving a lock request message and associated token concerning a specified subpart of the shared resource when the receiving processor's lock table shows a FREE state associated with specified subpart, the receiving processor returning a lock grant message including the associated token, updating the processor's lock table to list the specified subpart in association with the REMOTE state and the associated token;

responsive to a processor receiving a lock request message and associated token concerning a specified subpart of the shared resource when the receiving processor's lock table shows a REQ state associated with specified subpart, the receiving processor participating in a predetermined dispute resolution procedure against a processor that submitted the lock request message, and if the processor wins the procedure, placing the received lock in queue for later handling by the receiving processor;

if the processor loses the procedure, the receiving processor returning a lock grant message including the associated token, updating the processor's lock table to indicate the, updating the processor's lock table to list the specified subpart in association with the REMOTE state and in association with the associated token;

responsive to a processor receiving a lock request message and associated token concerning a specified subpart of the shared resource when the receiving processor's lock table shows a LOCAL state associated with specified subpart, the receiving processor placing the received lock in queue for later handling by the receiving processor.

51. The system of claim 31, where the processors are programmed such that the operation of storing lock tables is performed such that each lock table lists in association with each subpart:

a token;

a state selected from a state group including LOCAL, REQ, FREE, REMOTE;

wherein the processors are programmed such that the predetermined operations further comprise:

responsive to a processor receiving from each other processor at least one lock grant message and associated token concerning a specified subpart of the shared resource when the receiving processor's lock table shows a REQ state associated with specified subpart, the receiving processor performing operations comprising:

if each of the associated tokens matches the token for the specified subpart shown in the lock table, commencing the host access request and updating the processor's lock table to list the specified subpart in association with the LOCAL state and the associated token;

if the associated token does not match the token for the specified subpart shown in the lock table, sending a lock release message identifying the specified subpart and the associated token;

responsive to a processor receiving a lock grant message and associated token concerning a specified subpart of the shared resource when the receiving processor's lock table shows a REMOTE or FREE state associated with specified subpart, the receiving processor sending a lock release message identifying the specified subpart and the associated token.

52. The system of claim 31, where the processors are programmed such that the operation of storing lock tables is performed such that each lock table lists in association with each subpart:
a token;
a state selected from a state group including LOCAL, REQ, FREE, REMOTE;

wherein the processors are programmed such that the predetermined operations further comprise, responsive to a processor receiving a lock release message and associated token concerning a specified subpart of the shared resource when the receiving processor's lock table shows a REMOTE state associated with specified subpart, the receiving processor performing operations comprising:
only if the associated token does not match the token for the specified subpart shown in the lock table, the receiving processor returning a lock grant message including the token for the specified subpart shown in the lock table.

* * * * *